United States Patent
Remple et al.

(10) Patent No.: US 9,824,046 B2
(45) Date of Patent: Nov. 21, 2017

(54) USING USB SIGNALING TO TRIGGER A DEVICE TO ENTER A MODE OF OPERATION

(71) Applicant: QUALCOMM Incorporated, San Diego, CA (US)

(72) Inventors: Terrence Brian Remple, San Diego, CA (US); Devdutt Patnaik, San Diego, CA (US); Jay Yu Jae Choi, San Diego, CA (US); Yanru Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 14/337,844

(22) Filed: Jul. 22, 2014

(65) Prior Publication Data
US 2015/0032908 A1   Jan. 29, 2015

Related U.S. Application Data

(60) Provisional application No. 61/857,575, filed on Jul. 23, 2013.

(51) Int. Cl.
*G06F 3/00* (2006.01)
*G06F 13/38* (2006.01)
*H04L 9/08* (2006.01)
*G06F 13/42* (2006.01)

(52) U.S. Cl.
CPC ........ *G06F 13/385* (2013.01); *G06F 13/4291* (2013.01); *H04L 9/0838* (2013.01); *G06F 2213/0042* (2013.01); *G06F 2213/3854* (2013.01)

(58) Field of Classification Search
CPC .............................................. G06F 2213/0042
See application file for complete search history.

(56) References Cited

U.S. PATENT DOCUMENTS

| | | | |
|---|---|---|---|
| 6,038,624 A | 3/2000 | Chan et al. | |
| 7,085,876 B2 | 8/2006 | Lai et al. | |
| 7,635,280 B1 | 12/2009 | Crumlin et al. | |
| 8,200,852 B2 * | 6/2012 | Liu et al. | 710/4 |
| 8,237,414 B1 | 8/2012 | Li et al. | |
| 8,595,725 B2 | 11/2013 | Tjia et al. | |
| 8,626,932 B2 | 1/2014 | Lydon et al. | |
| 8,683,163 B2 | 3/2014 | Morfey et al. | |

(Continued)

OTHER PUBLICATIONS

USB in a NutShell—Chapter 2, p. 3-4.*
International Search Report and Written Opinion—PCT/US2014/047847—ISA/EPO—Oct. 1, 2014.

*Primary Examiner* — Henry Tsai
*Assistant Examiner* — Juanito Borromeo
(74) *Attorney, Agent, or Firm* — Loza & Loza LLP

(57) ABSTRACT

A method of triggering a desired operating mode in a universal serial bus (USB)-compatible client device is provided. A USB-compatible client device detects that it has been coupled to a USB-compatible host device via a USB bus. The USB-compatible client device attempts to pull a data line of the USB bus high. The USB-compatible client device then ascertains that the data line remains pulled low, thereby indicating that the USB-compatible client device should enter a first mode of operation. The USB-compatible client device operates according to the first mode of operation.

27 Claims, 19 Drawing Sheets

(56) References Cited

U.S. PATENT DOCUMENTS

| | | |
|---|---|---|
| 2005/0182925 A1 | 8/2005 | Tsukamura |
| 2007/0220499 A1 | 9/2007 | Bannatyne et al. |
| 2008/0140885 A1* | 6/2008 | Collins .......................... 710/67 |
| 2008/0222341 A1 | 9/2008 | Lin et al. |
| 2009/0049307 A1 | 2/2009 | Lin |
| 2009/0254682 A1 | 10/2009 | Tseng et al. |
| 2009/0307380 A1 | 12/2009 | Lee et al. |
| 2012/0117310 A1 | 5/2012 | Liu et al. |
| 2013/0067119 A1 | 3/2013 | Wong |
| 2015/0032909 A1 | 1/2015 | Remple et al. |

* cited by examiner

USING USB SIGNALING TO TRIGGER A DEVICE TO ENTER A MODE OF OPERATION

CROSS-REFERENCE TO RELATED APPLICATIONS

This application claims priority to and the benefit of U.S. Provisional Patent Application No. 61/857,575, filed on Jul. 23, 2013, the entire content of which is incorporated herein by reference.

This application is related to concurrently filed and commonly owned U.S. patent application Ser. No. 14/337,904, filed on Jul. 22, 2014, entitled "USING USB SIGNALING TO TRIGGER A DEVICE TO ENTER A MODE OF OPERATION,", the entire content of which is incorporated by reference herein.

BACKGROUND

Field

At least one aspect generally relates to universal serial bus (USB) devices, and more particularly, but not exclusively, to triggering special modes of operation in USB-enabled devices.

Background

Universal Serial Bus (USB) is an industry standard that defines the cables, connectors, interfaces, and communications protocols used in a bus for connecting, communicating, and/or supplying power between electronic devices. Devices that implement USB include keyboards, pointing devices, digital cameras, printers, portable media players, disk drives, network adapters, smartphones, personal digital assistants, video game consoles, power chargers, among many other types of devices.

During early development stages of portable/embedded devices or in early boot stages of such devices, there is often a lack of keypad support which is desirable to trigger different modes of operation in the device. For example, such modes may include debug mode, logging mode, provisioning mode, or a combination of these modes, which may be used during development and/or testing stages of a device.

In one example, a provisioning process for embedded devices may be performed over USB. Existing methods to trigger such a provisioning mode include detecting an empty Flash or secure digital (SD)/embedded multimedia card (eMMC) card, or simply performing a USB enumeration and waiting for a command from a USB host. These methods are not useful or efficient in the cases where it is desired to force the device to enter provisioning mode or some other mode.

Therefore, there is a need for techniques that cause a device to enter a particular mode of operation without the use of a keypad.

SUMMARY

The following summarizes some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a summary form as a prelude to the more detailed description that is presented later.

Various aspects of the disclosure provide for signaling a device to enter a particular mode of operation. This mode of operation can include a non-mission mode of operation such as a debug mode, a logging mode, a provisioning mode, or some other suitable type of operational mode.

Some aspects of the disclosure provide for using a data line such as a D+ line or a D− line of a USB cable or bus to perform signaling that triggers a USB client device to enter a desired mode (e.g., non-mission mode). Here, a combination of manipulating (e.g., pulling down) the data line and sensing this condition on the USB client device can trigger the USB client device to enter a non-mission mode of operation.

In some implementations, a data line is pulled down to a logic low (e.g., at or near ground) using a switch along a USB cable or bus between a USB host device and the USB client device. For instance, the switch may be included in a dongle and serve to connect the data line to ground (GND), thereby indicating to the USB client device that it should enter a particular mode.

In some implementations, USB host device driver software is configured perform the desired signaling on a data line of the USB bus. For example, a driver circuit of the USB host device can be controlled to drive the data line to a logic low.

Advantageously, the above techniques can effectively trigger a desired mode of operation without the need for custom hardware on the USB client device and/or the USB host device. Accordingly, these techniques may provide a cost effective way of operating a USB device in a non-mission mode of operation.

Further aspects of the disclosure provide a method including detecting that the USB-compatible client device has been coupled to a USB-compatible host device via a USB bus; attempting to drive a data line of the USB bus to a logic high as a result of the detection; determining that the data line is at a logic low during the attempt to drive the data line to a logic high, thereby indicating that the USB-compatible client device is to enter a first mode of operation; and operating the USB-compatible client device according to the first mode of operation as a result of the determination that the data line is at a logic low.

Still further aspects of the disclosure provide a USB-compatible client device that includes a USB interface and a USB processing circuit coupled to the USB interface. The USB processing circuit is configured to detect that the USB-compatible client device has been coupled to a USB-compatible host device via a USB bus; attempt to drive a data line of the USB bus to a logic high as a result of the detection; determine that the data line is at a logic low during the attempt to drive the data line to a logic high, thereby indicating that the USB-compatible client device is to enter a first mode of operation; and operate the USB-compatible client device according to the first mode of operation as a result of the determination that the data line is at a logic low.

Additional aspects of the disclosure provide a USB-compatible host device including means for detecting that the USB-compatible client device has been coupled to a USB-compatible host device via a USB bus; means for attempting to drive a data line of the USB bus to a logic high as a result of the detection; means for determining that the data line is at a logic low during the attempt to drive the data line to a logic high, thereby indicating that the USB-compatible client device is to enter a first mode of operation; and means for operating the USB-compatible client device according to the first mode of operation as a result of the determination that the data line is at a logic low.

Other aspects of the disclosure provide a non-transitory machine-readable medium having stored thereon instructions for detecting that the USB-compatible client device has been coupled to a USB-compatible host device via a USB bus; attempting to drive a data line of the USB bus to a logic high as a result of the detection; determining that the data line is at a logic low during the attempt to drive the data line to a logic high, thereby indicating that the USB-compatible client device is to enter a first mode of operation; and operating the USB-compatible client device according to the first mode of operation as a result of the determination that the data line is at a logic low.

Examples of other aspects of the disclosure related to the above follow. In some aspects, another data line of the USB bus is driven to a logic high as a result of the determination that the data line is at a logic low. In some aspects, the data line is a D+ line; and the other data line is a D− line. In some aspects, operating the USB-compatible client device according to the first mode of operation is triggered as a result of driving the other data line to a logic high. In some aspects, the other data line is driven to a logic high within a threshold period of time after detecting that the USB-compatible client device has been coupled to the USB-compatible host device. In some aspects, the determination that the data line is at a logic low is performed within a threshold period of time after detecting that the USB-compatible client device has been coupled to the USB-compatible host device. In some aspects, the data line is driven to a logic high for a period of time that is less than a reset time period. In some aspects, the detection comprises detecting presence of a voltage on a power line of the USB bus. In some aspects, the data line is driven to a logic low prior to the USB-compatible client device being coupled to the USB-compatible host device. In some aspects, the data line is driven to a logic low by externally coupling the data line to ground. In some aspects, the data line is driven to a logic low by a switch on the USB bus that couples the data line to a ground line. In some aspects, the data line is driven to a logic low at a transmit driver of the USB-compatible host device. In some aspects, an enumeration mode of operation is entered following the first mode of operation. In some aspects, an attempt is made to perform a key exchange with the USB-compatible host device, and the first mode of operation is exited if the key exchange is not completed within a specified time period. In some aspects, a key obtained during the key exchange is used to secure data transmissions between the USB-compatible client device and the USB-compatible host device.

Further aspects of the disclosure provide a method including driving a data line of a USB bus to a logic low prior to coupling of the USB-compatible host device to the USB-compatible client device via the USB bus; ceasing the driving of the data line to a logic low in response to a specified event that occurs after the coupling of the USB-compatible host device to the USB-compatible client device via the USB bus; and sending a data transmission over the USB bus according to a first mode of operation indicated by the driving of the data line to a logic low.

Still further aspects of the disclosure provide a USB-compatible host device that includes a USB interface and a USB processing circuit coupled to the USB interface. The USB processing circuit is configured to drive a data line of a USB bus to a logic low prior to coupling of the USB-compatible host device to the USB-compatible client device via the USB bus; cease the driving of the data line to a logic low in response to a specified event that occurs after the coupling of the USB-compatible host device to the USB-compatible client device via the USB bus; and send a data transmission over the USB bus according to a first mode of operation indicated by the driving of the data line to a logic low.

Additional aspects of the disclosure provide a USB-compatible host device including means for driving a data line of a USB bus to a logic low prior to coupling of the USB-compatible host device to the USB-compatible client device via the USB bus; means for ceasing the driving of the data line to a logic low in response to a specified event that occurs after the coupling of the USB-compatible host device to the USB-compatible client device via the USB bus; and means for sending a data transmission over the USB bus according to a first mode of operation indicated by the driving of the data line to a logic low.

Other aspects of the disclosure provide a non-transitory machine-readable medium having stored thereon instructions for driving a data line of a USB bus to a logic low prior to coupling of the USB-compatible host device to the USB-compatible client device via the USB bus; ceasing the driving of the data line to a logic low in response to a specified event that occurs after the coupling of the USB-compatible host device to the USB-compatible client device via the USB bus; and sending a data transmission over the USB bus according to a first mode of operation indicated by the driving of the data line to a logic low.

Examples of other aspects of the disclosure related to the above follow. In some aspects, the specified event comprises another data line of the USB bus being driven to a logic high. In some aspects, the data line is a D+ line; and the other data line is a D− line. In some aspects, the data transmission is sent as a result of the other data line being driven to a logic high. In some aspects, the specified event comprises passing of a threshold period of time. In some aspects, the specified event comprises passing of a threshold period of time after the coupling of the USB-compatible host device to the USB-compatible client device. In some aspects, the data line is driven to a logic low within a threshold period of time after the coupling of the USB-compatible host device to the USB-compatible client device. In some aspects, the driving of the data line to a logic low is not dependent on the data line being previously driven to a logic high. In some aspects, the data line is driven to a logic low after operating according to the first mode of operation to commence a second mode of operation. In some aspects, the data line is driven to a logic low at a transmit driver of the USB-compatible host device. In some aspects, an attempt is made to perform a key exchange with the USB-compatible host device, and the first mode of operation is exited if the key exchange is not completed within a specified time period. In some aspects, a key obtained during the key exchange is used to secure data transmissions between the USB-compatible client device and the USB-compatible host device.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

Exemplary Operating Environment

For purposes of illustration, various aspects of the disclosure will be discussed in the context of a USB system. However, the teachings herein are also applicable to other types of communication technologies.

Figure 1:
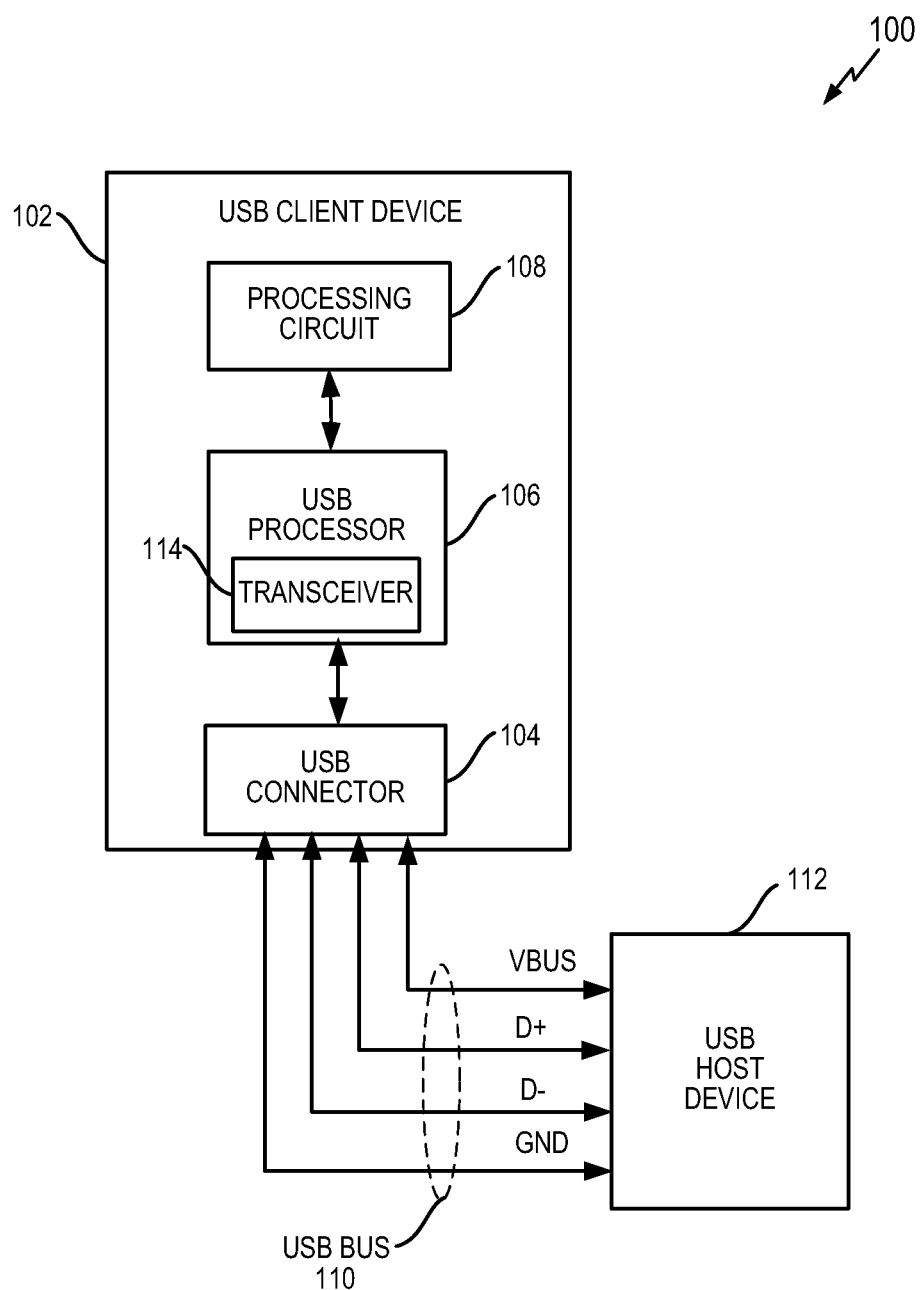
FIG. 1 is a block diagram illustrating a communication system in which one or more features described herein may be implemented.

FIG. 1 is a block diagram illustrating an example of a system 100 in which one or more features described herein may be implemented. A USB client device 102 is coupled to a USB host device 112 by a USB bus 110. The USB client device 102 includes a USB connector or interface 104 for coupling to the USB bus 110, a USB processor 106 coupled to the USB connector 104, and a processing circuit 108 coupled to the USB processor 106. The USB connector 104 may provide, for example, power, ground, signals, or some combination thereof from the USB bus 110 to the USB processor 106. The USB processor 106, including a transceiver circuit 114, may decode signals received from the USB bus 110 and/or encode signals to be transmitted over the USB bus 110. The USB processor 106 may send the decoded signals or data therein to the processing circuit 108. The processing circuit may process received data and/or generate data for transmission over the USB bus 110. In the example of FIG. 1, the USB bus 110 includes a power line (VBUS), a ground line (GND), a positive data line (D+), and a negative data line (D−).

First Example Technique to Trigger a Desired USB Mode

Figure 2:
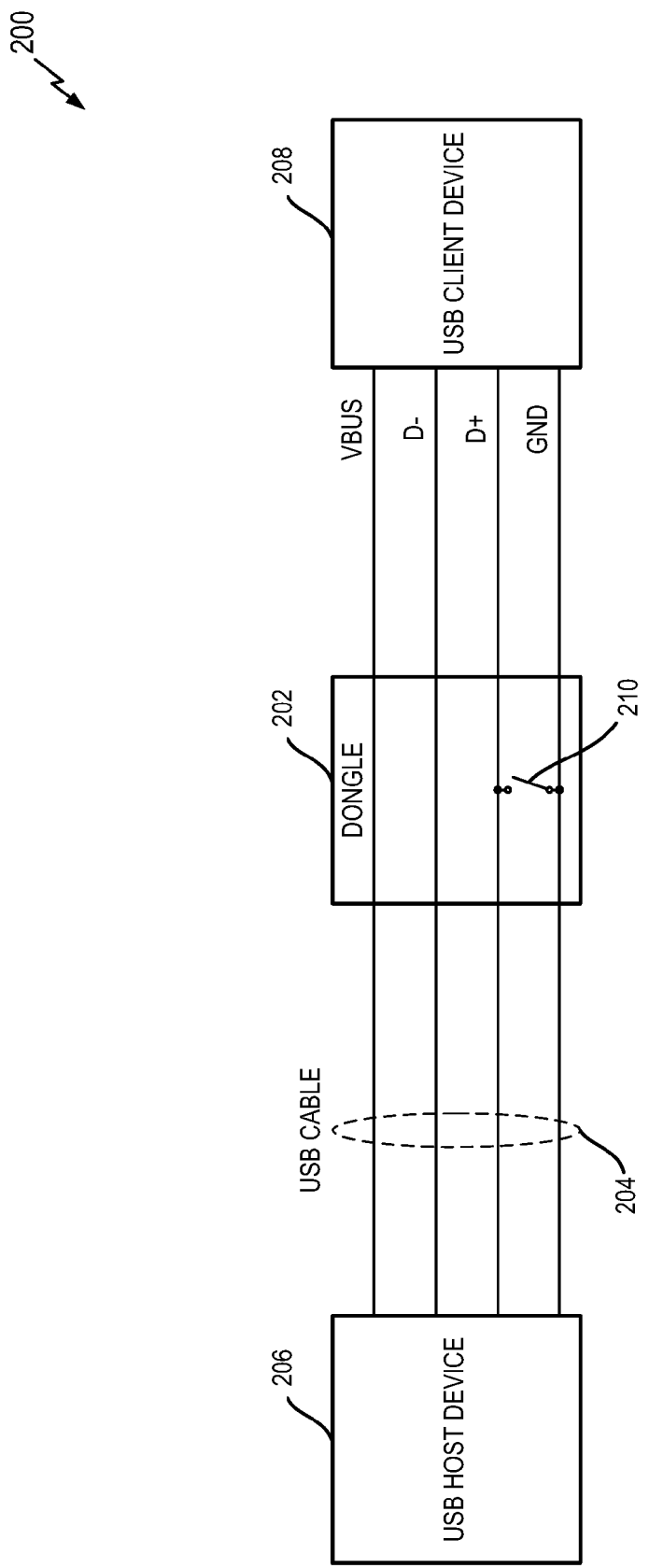
FIG. 2 illustrates an example of a technique in which a switch, along a USB bus or cable between a USB host device and USB client device, is used to trigger a desired mode of operation in accordance with some aspects of the disclosure.

FIG. 2 illustrates an example of system 200 employing a first technique in which a dongle 202 or other suitable device, along a USB bus or cable 204 between a USB host device 206 and USB client device 208, is used to trigger a desired mode of operation. In this example, the dongle 202 includes a switch 210 that serves to ground the D+ line, thereby serving as an indicator to the USB client device 208 that a particular USB mode is being triggered.

This technique of holding the D+ line to ground may be applicable for USB client devices which enumerate at full speed or high speed modes. However, a similar technique is applicable by holding the D− line to ground when the USB host device enumerates at Low-Speed mode.

Figure 3:
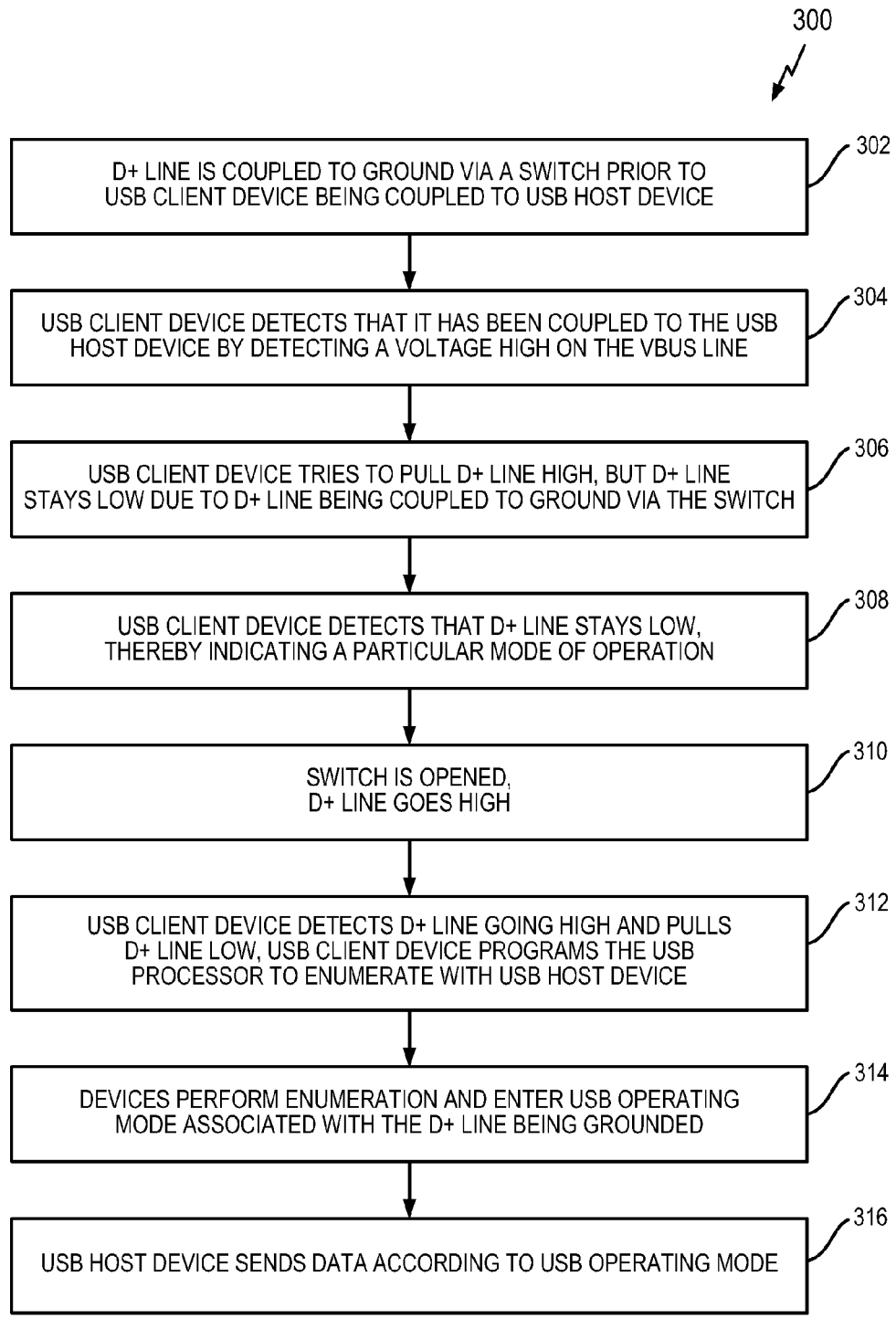
FIG. 3 illustrates an example of a method for triggering a desired mode of operation on a USB capable client device in accordance with some aspects of the disclosure.

FIG. 3 illustrates an example of a method 300 for triggering a desired mode of operation on a USB client device. The method 300 may take place within a processing circuit (e.g., the processing circuit 108 of FIG. 1), which may be located in a USB client device. Of course, in various aspects within the scope of the disclosure, the method 300 may be implemented by any suitable apparatus capable of supporting signaling operations.

At block 302, before a USB client device is attached to USB host device, a switch (along a bus or cable) is used to couple the D+ line to ground. At block 304, when the USB client device is coupled (e.g., attached) to the USB host device, the USB client device detects a voltage high on the VBUS line 204.

At block 306, the USB client device attempts to pull the D+ line high. For example, a device driver may enable a pull-up resistor (Rpu) on the D+ line in the USB PHY layer, without enabling the USB Link controller or USB processor 106. However, the D+ line stays low due to the switch.

At block 308, the USB client device detects that the D+ line has stayed low (e.g., by reading the line-state 5 microseconds after attempting to pull it high), which indicates a desired mode of operation. That is, since the D+ line-state is read as a single-ended zero (SE0), i.e., D+ and D− are low, the USB client device determines that a particular mode (e.g., a provisioning mode, etc.) is being requested.

At block 310, the switch is opened so that the D+ line goes high. At block 312, upon detecting this condition, the USB client device pulls the D+ line low and programs the USB processor 106 to prepare for enumeration with the USB host device.

At block 314, the USB host and client devices perform enumeration and enter the USB operating mode associated with this triggering condition (e.g., the D+ line being pulled to ground). Consequently, at block 316, the USB host device may then send data, command, instructions, or a combination thereof to the USB client device according to the USB operating mode. For example, the USB host device may enumerate the USB client device and perform provisioning of images (e.g., data, software, etc.) onto the USB client device.

Advantageously, the techniques taught herein do not disrupt normal signaling operation over a standard USB cable or bus, or if the switch was closed at the outset. As noted above, the pull-up resistor is enabled for a very short interval (step 306). Per the USB 2.0 Connect Timing Engineering Change Notice (ECN), the minimum debounce interval for a USB host device to send any requests to a USB client device (such as USB Reset) is 100 milliseconds (ms). By ensuring that the D+ line is pulled high for a very short interval and the D+ line state is read within 5 microseconds, side-effects that would otherwise alter normal USB signaling behavior are avoided.

The signaling technique of FIG. 2 may be implemented in various ways in different embodiments. Two examples of these techniques will be described with reference to FIGS. 4-8.

Timer-Based Signaling Technique

Figure 4:
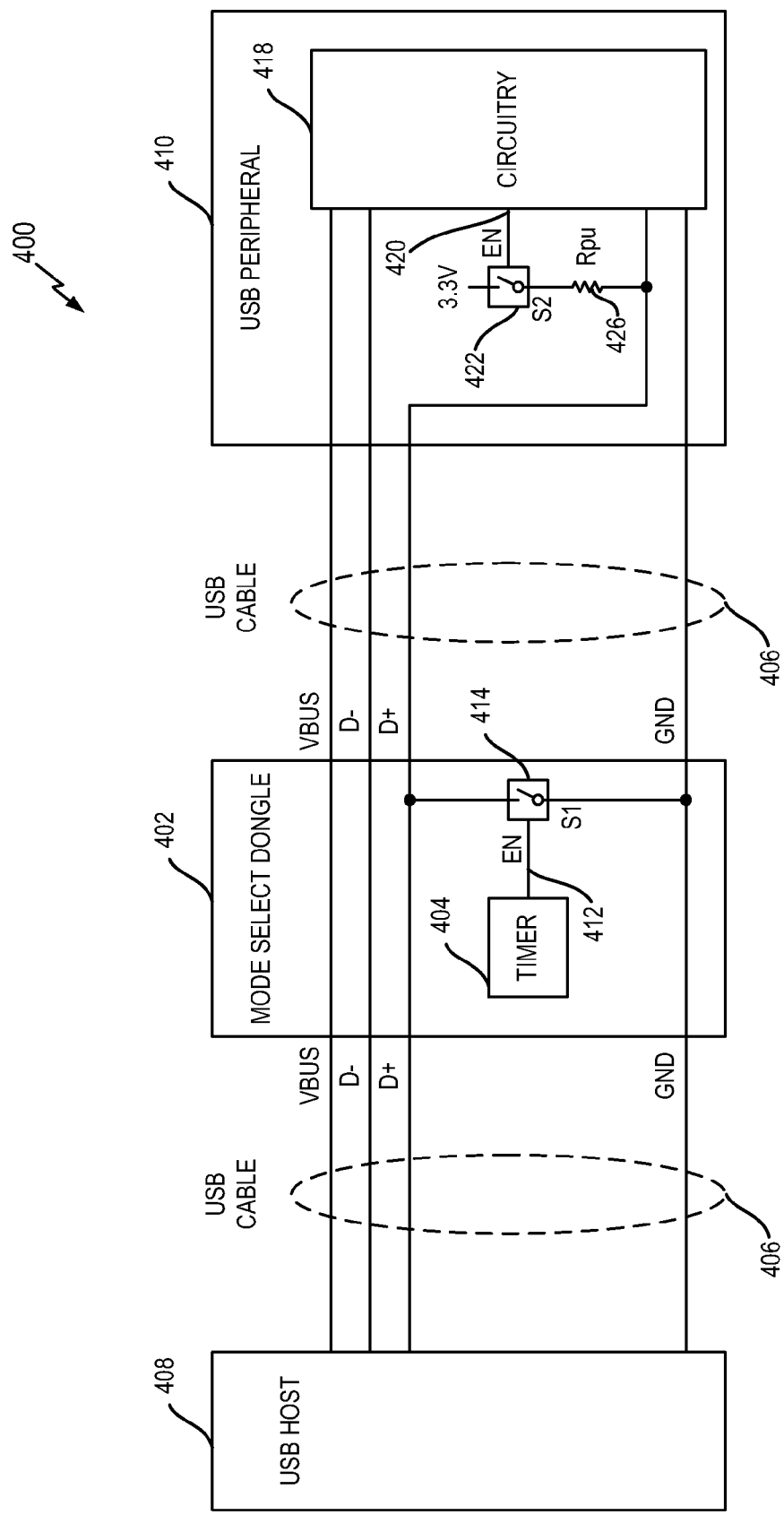
FIG. 4 illustrates an example of system employing a dongle with a timer to trigger a desired mode of operation in accordance with some aspects of the disclosure.

FIG. 4 illustrates an example of a system 400 where a mode select dongle 402 includes a timer 404 for triggering a desired mode of operation on a USB client device. Similar to the system 200 of FIG. 2, the dongle 402 is along a USB cable 406 between a USB host 408 and USB peripheral (e.g., client) 410. VBUS, D−, D+, and GND lines are shown for the USB bus 406.

The timer 404 generates an enable (EN) signal 412 that controls a switch S1 414.

When enabled, the switch S1 414 couples the D+ line to GND.

The USB peripheral 410 includes circuitry 418 that senses the D+ line and generates an enable (EN) signal 420 that controls a switch S2 422. When enabled, the switch S2 422 causes the D+ line to be pulled-up via a resistor (Rpu) 426 to 3.3 volts (3.3V).

Figure 5:
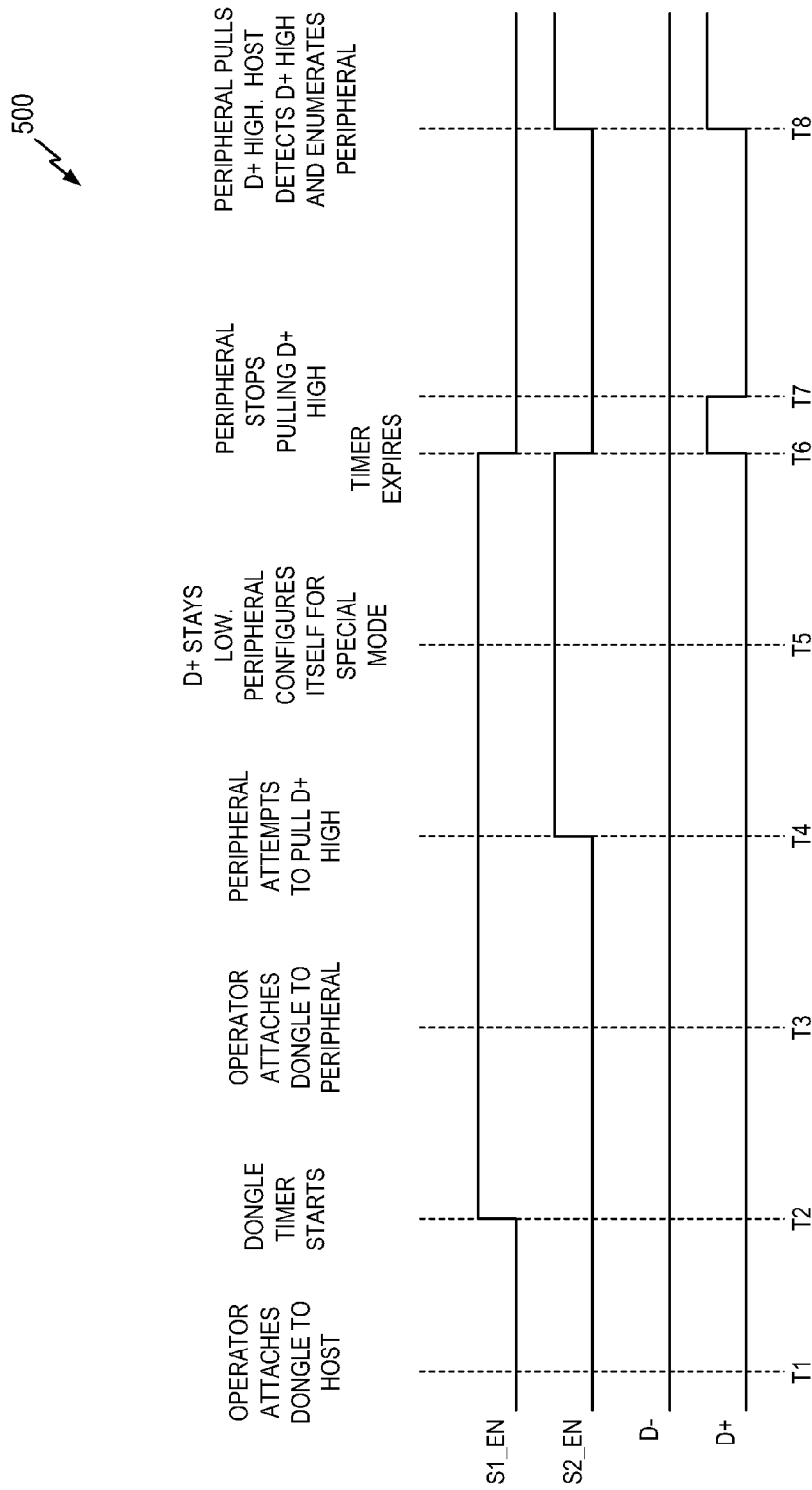
FIG. 5 illustrates an example of signals generated by the system of FIG. 4 in accordance with some aspects of the disclosure.

FIG. 5 illustrates an example of operations performed by and signaling generated by the system 400. Here, S1_EN corresponds to the enable signal 412 and S2_EN corresponds to the enable signal 420.

At time T1, an operator attaches the dongle 402 to the USB host 408. At time T2, the timer 404 starts. For example, the operator may manually start the timer 404 (e.g., via a switch, not shown) or the timer 404 may automatically start once the dongle 402 is attached to the USB host 408. When the timer 404 starts, the enable signal 412 (S1_EN line) goes high, thereby closing the switch S1 and driving the D+ line to GND.

At time T3, the operator attaches the dongle 402 to the USB peripheral 410. It should be appreciated that the operations shown for T2 and T3 may be reversed or coincide in some implementations. For example, the timer 404 may be started by the operator or may automatically start once the dongle 402 is attached to the USB peripheral 410.

At time T4, the USB peripheral 410 attempts to pull the D+ line high. Specifically, the circuitry 418 causes the enable signal 420 (S2_EN line) to go high thereby closing the switch S2 422 and coupling the D+ line to 3.3 V via the pull-up resistor Rpu 426.

At time T5, the circuitry 418 senses that the D+ line stayed low. Consequently, the circuitry 418 configures the USB peripheral 410 to operate in a special mode of operation (e.g., a non-mission mode).

The timer expires at time T6. Thus, the enable signal 412 (S1_EN line) goes low, opening the switch S1 416 and decoupling the D+ line from GND. As a result, the USB peripheral 410 is able to pull the D+ line high. In some embodiments, the timer period is at least 500 milliseconds. In some embodiments, the timer period is several seconds (e.g., 2-3 seconds). Other timer periods may be used in other embodiments.

At time T7, the USB peripheral 410 stops attempting to pull the D+ line high. Specifically, the circuitry 418 causes the enable signal 420 (S2_EN line) to go low thereby opening the switch S2 422. Consequently, the D+ line goes low.

At time T8, the USB peripheral 410 pulls the D+ line high to commence enumeration with the USB host 408. Thus, once the USB host 408 detects that the D+ line is high (e.g., following a 100 millisecond debounce time period after time T3), the USB host 408 enumerates the USB peripheral 410.

Control Logic-Based Signaling Technique

Figure 6:
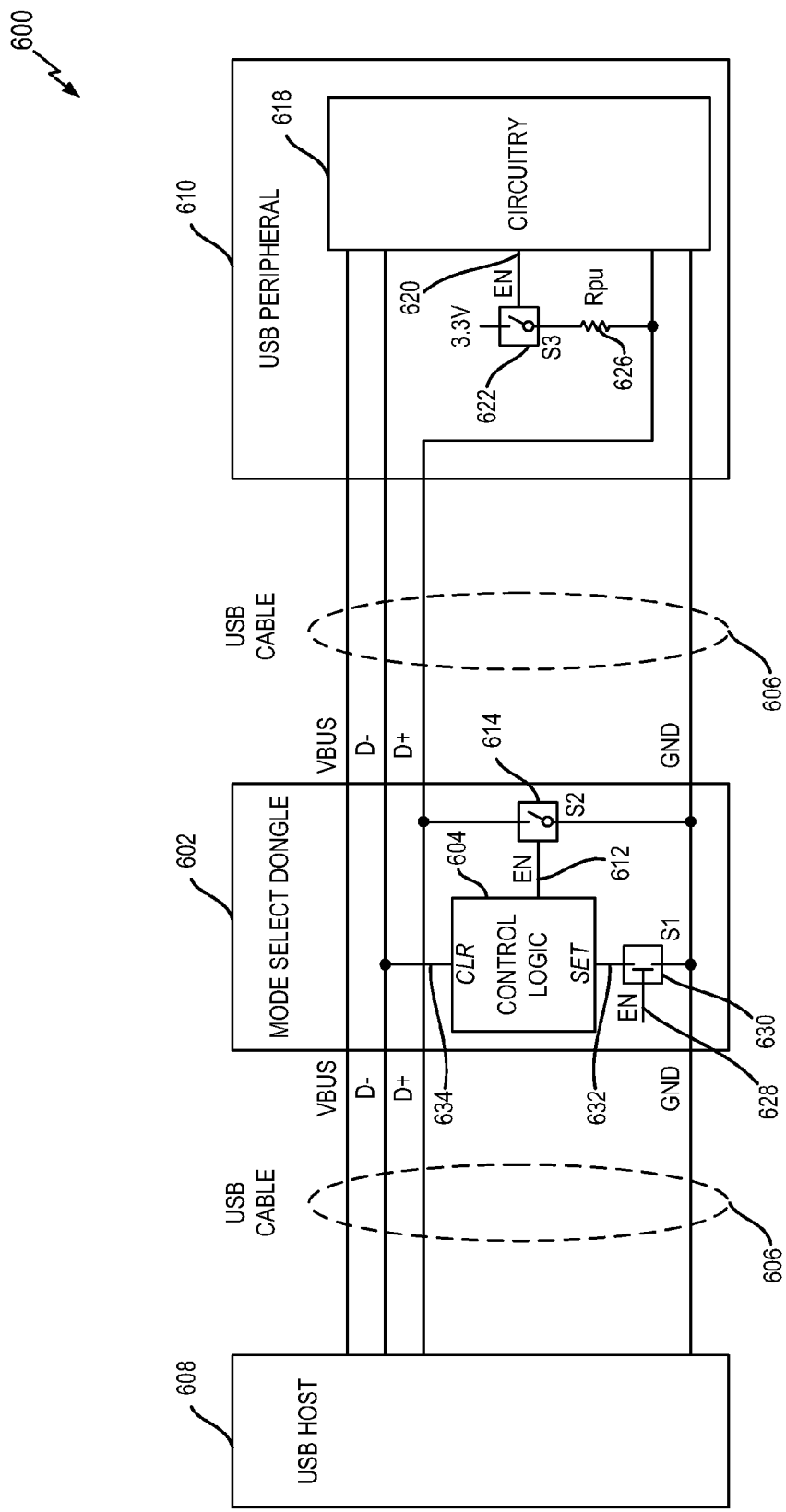
FIG. 6 illustrates an example of system employing a dongle with control logic to trigger a desired mode of operation in accordance with some aspects of the disclosure.

FIG. 6 illustrates an example of a system 600 where a mode select dongle 602 includes control logic 604 for triggering a desired mode of operation on a USB client device. Similar to the system 200 of FIG. 2, the dongle 602 is along a USB cable 606 between a USB host 608 and USB peripheral (e.g., client) 610. Again, VBUS, D−, D+, and GND lines are shown for the USB bus 606. In this case, however, the control logic 604 terminates the trigger signaling in response to the USB peripheral 610 toggling the D− line.

The control logic 604 generates an enable (EN) signal 612 that controls a switch S2 614. When enabled, the switch S2 614 couples the D+ line to GND.

The USB peripheral 610 includes circuitry 618 that generates an enable (EN) signal 620 that controls a switch S3 622. When enabled, the switch S3 622 causes the D+ line to be pulled-up via a resistor (Rpu) 626 to 3.3 volts (3.3V). The circuitry 618 also senses the D+ line and toggles the D− line to terminate the signaling that triggers a special (e.g., non-mission) mode of operation.

Figure 7:
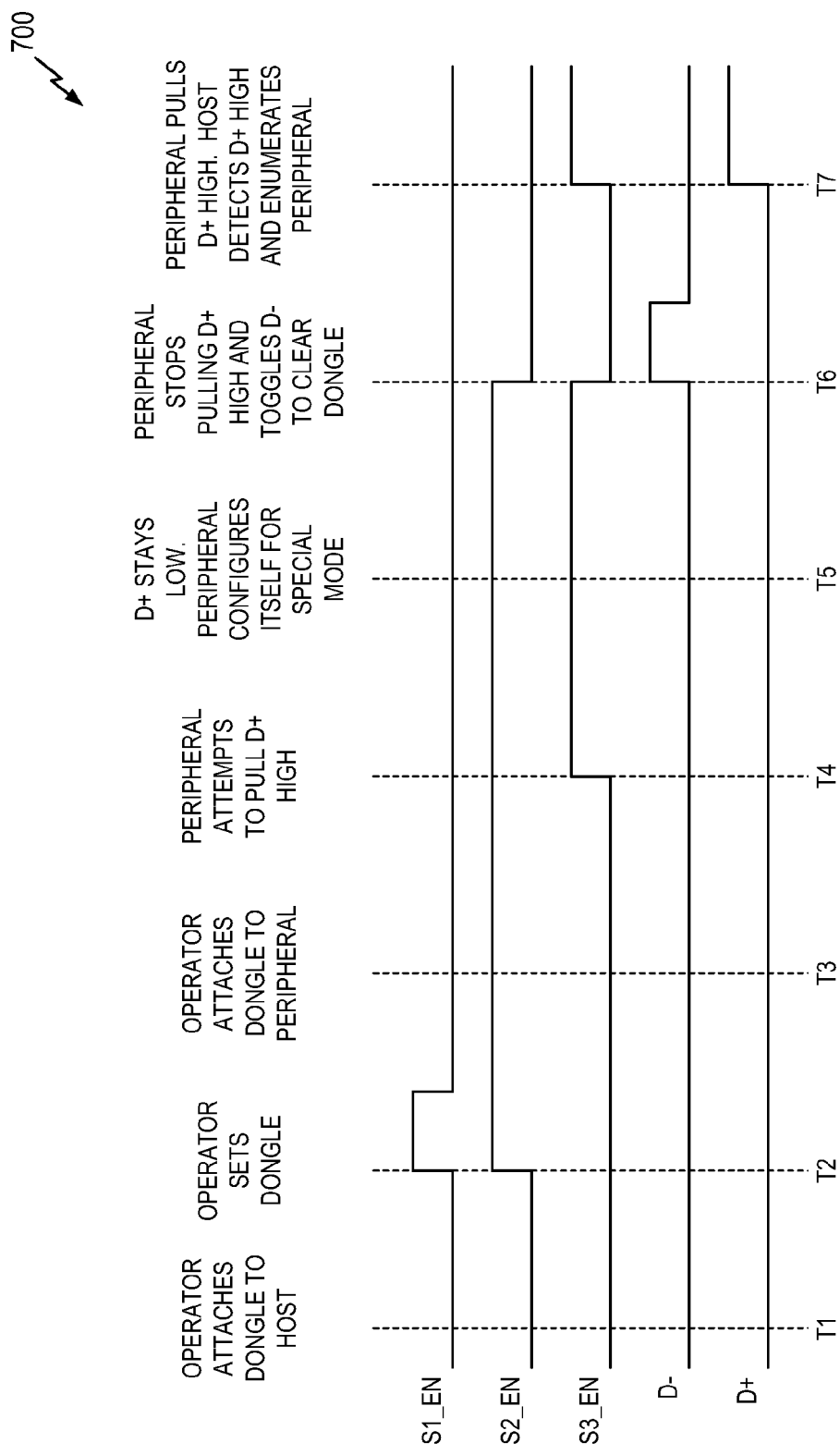
FIG. 7 illustrates an example of signals generated by the system of FIG. 6 in accordance with some aspects of the disclosure.

FIG. 7 illustrates an example of operations performed by and signaling generated by the system 600. Here, S1_EN corresponds to an enable (EN) signal 628 for a switch S1 630, S2_EN corresponds to the enable signal 612, and S3_EN corresponds to the enable signal 620.

At time T1, an operator attaches the dongle 602 to the USB host 608. At time T2, the operator sets the dongle 602. For example, the operator may generate the enable signal 628 (S1_EN line) that causes the switch S1 630 to temporarily close (alternatively, the operator could manually control the switch S1 630). Closure of the switch S1 630 causes GND to be coupled to a SET input 632 of the control logic 604, thereby causing the enable signal 612 (S2_EN line) to go high. This, in turn, closes the switch S2 614 causing the D+ line to be coupled to GND.

At time T3, the operator attaches the dongle 602 to the USB peripheral 610. It should be appreciated that the operations shown for T2 and T3 may be reversed or coincide in some implementations. For example, the dongle 604 may be set by the operator once the dongle 602 is attached to the USB peripheral 610.

At time T4, the USB peripheral 610 attempts to pull the D+ line high. Specifically, the circuitry 618 causes the enable signal 620 (S3_EN line) to go high thereby closing the switch S2 622 and coupling the D+ line to 3.3 V via the pull-up resistor Rpu 626.

At time T5, the circuitry 618 senses that the D+ line stayed low. Consequently, the circuitry 618 configures the USB peripheral 610 to operate in a special mode of operation (e.g., a non-mission mode).

At time T6, the USB peripheral 610 stops attempting to pull the D+ line high. Specifically, the circuitry 618 causes the enable signal 620 (S3_EN line) to go low thereby opening the switch S2 622.

In addition, the USB peripheral 610 toggles the D− line to clear the dongle 602. Specifically, the circuitry 618 causes the D− line to temporarily go high which is coupled to a CLEAR input 634 of the control logic 604, thereby causing the enable signal 612 (S2_EN line) to go low. This, in turn, opens the switch S2 614 causing the D+ line to be decoupled from GND.

At time T7, the USB peripheral 610 pulls the D+ line high to commence enumeration with the USB host 608. Thus, once the USB host 608 detects that the D+ line is high (e.g., following a 100 millisecond debounce time period after time T3), the USB host 608 enumerates the USB peripheral 610.

Transceiver Example

Figure 8:
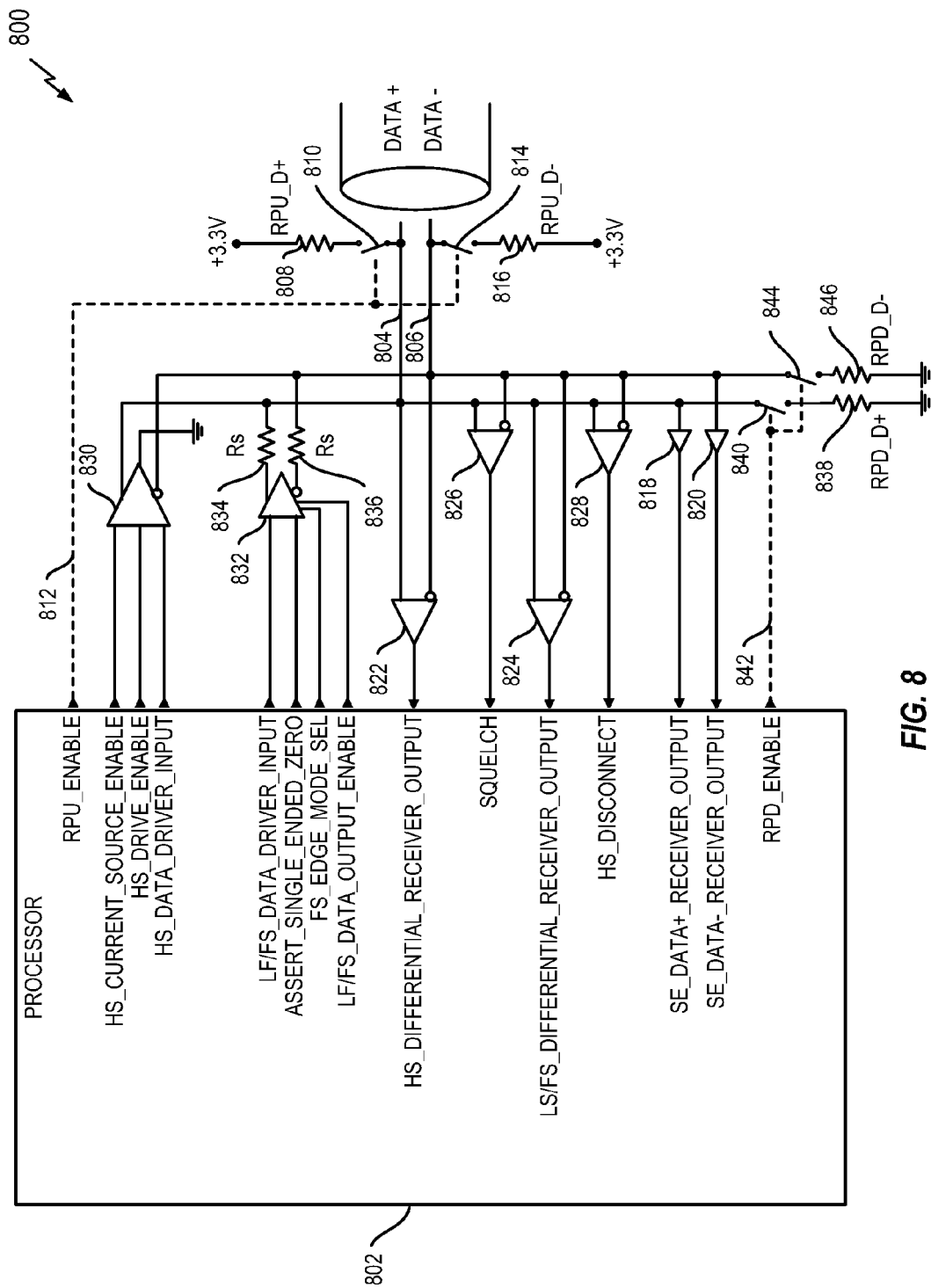
FIG. 8 illustrates an example of a high speed USB transceiver circuit that serves to send and receive signals over a USB bus in accordance with some aspects of the disclosure.

FIG. 8 illustrates an example of a high speed USB transceiver circuit 800 that serves to send and receive signals over a USB bus. In particular, the USB transceiver circuit 800 includes a processor 802 that communicates via a Data+ (D+) line 804 and/or a Data− (D−) line 806 of a USB bus. To reduce the complexity of FIG. 8, other components of the USB bus are not shown.

Such a USB transceiver circuit 800 may be part of the USB client device 102 and/or USB host device 112 in FIG. 1. For example, the same version of the USB transceiver circuit 800 may be incorporated into both host and client devices, whereby a given USB transceiver circuit 800 is configured (e.g., programmed) in a different manner depending on whether the circuit is being used in a host device or a client device. For example, as discussed below, pull-up resistors may be selectively used in client devices, while pull-down resistors may be selectively used in host devices.

For a client device, a pull-up resistor RPU_D+ 808 can be selectively coupled to the D+ line 804 via a switch 810. The switch 810 is controlled by an enable signal 812 (RPU_ENABLE). In practice, the enable signal 812 may consist of multiple signals. For example, the enable signal 812 may also control a switch 814 that selectively couples a pull-up resistor RPU_D− 816 to the D− line 806.

The USB transceiver circuit 800 also includes various transmit drivers and various receive drivers in accordance with the USB specification. Each such receive driver may serve to receive a different type of signal and/or operate in different modes.

In the USB client device 102 and/or the USB host device 112, one or more of the various receive drivers may be monitored or polled to detect different signals and/or conditions. For example, single-ended receivers 818 and 820 generate an indication of the state (e.g., logic high or logic low) of the D+ and D− lines, respectively. Differential receivers 822 and 824 are used to receive high speed and low/full speed signals, respectively. Receivers 826 and 828 are used to receive squelch-related and disconnect-related signals, respectively.

In the USB client device 102 and/or the USB host device 112, one or more of the various transmit drivers may be used to send signals over or otherwise control the state of the D+ and D− lines 804 and 806. For example, a high speed driver 830 is used to transmit high speed data over the D+ and D− lines 804 and 806. Also, a driver 832 is used to transmit low/full-speed data over the D+ and D− lines 804 and 806, and otherwise control the state of the D+ and D− lines 804 and 806. As an example of the latter case, the driver 832 can drive the D+ and D− lines 804 and 806 to a logic low via series resistors (Rs) 834 and 836. In some implementations, each of the resistors (Rs) 834 and 836 has an impedance of 45 Ohms.

For a host device, a pull-down resistor RPD_D+ 838 can be selectively coupled to the D+ line 804 via a switch 840. The switch 840 is controlled by an enable signal 842 (RPD_ENABLE). In practice, the enable signal 842 may consist of multiple signals. For example, the enable signal 842 may also control a switch 844 that selectively couples a pull-down resistor RPD_D− 846 to the D− line 806.

Second Example Technique to Trigger a Desired USB Mode

According to a second approach, a desired USB mode of operation may be triggered using software driver control on a USB host device.

Figure 9:
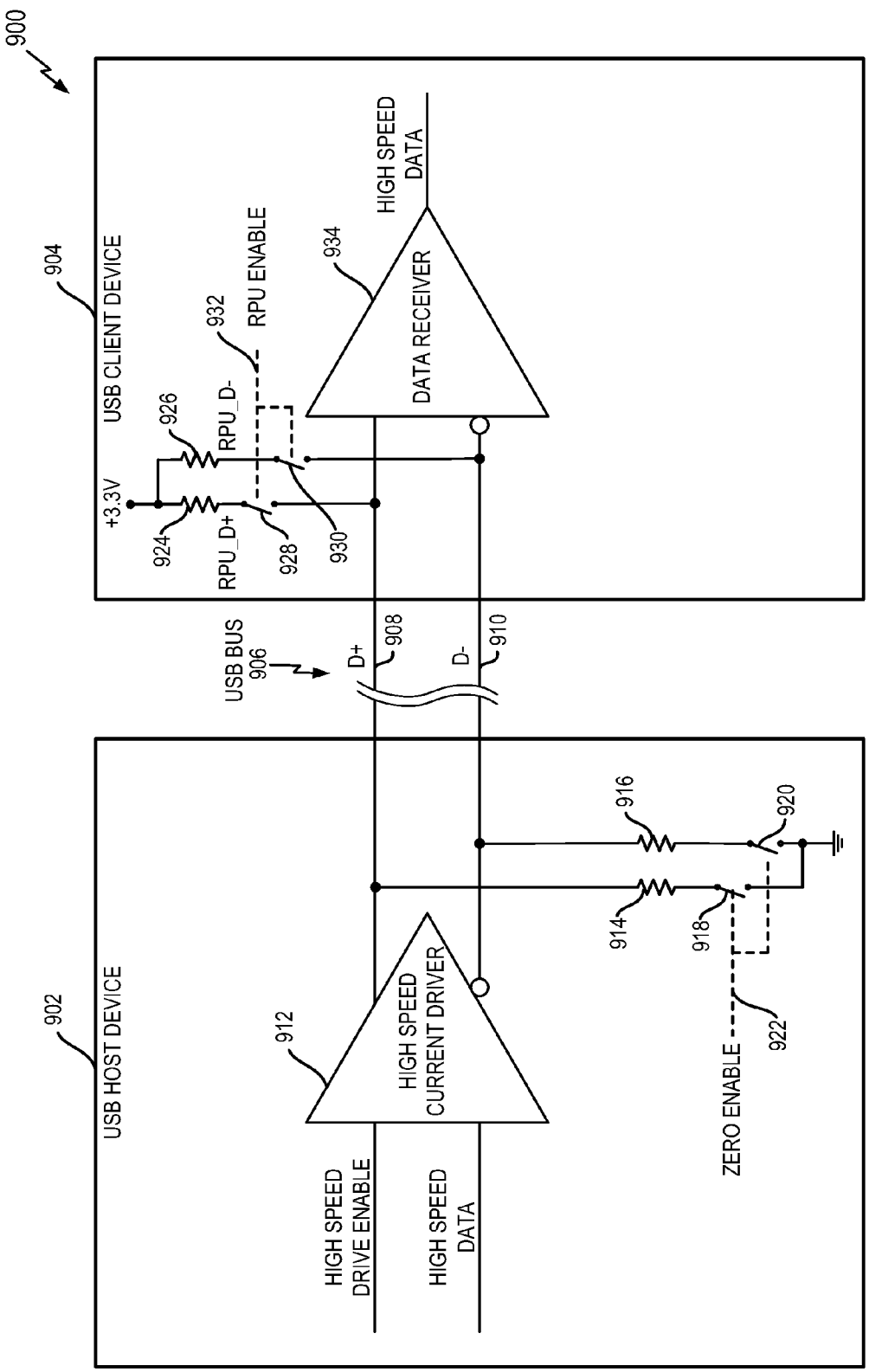
FIG. 9 is a block diagram illustrating how a USB host device may trigger a desired USB operating mode on a USB client device to which it is coupled over a USB bus in accordance with some aspects of the disclosure.

FIG. 9 is a block diagram of a system 900 illustrating how a USB host device 902 may trigger a desired USB operating mode on a USB client device 904 to which it is coupled over a USB bus 906. For convenience, only a D+ line 908 and a D− line 910 of the USB bus 906 are shown.

Instead of using a switch along the cable or bus (e.g., in a dongle) to pull down the D+ line 908 to ground (as in FIG. 2), the second approach configures a software driver on the USB host device 902 to pull down the D+ line 908 at a high speed current driver 912 of the USB host device 902. As indicated, both the D+ line 908 and the D− line 910 can be selectively driven to ground via pull-down resistors 914 and 916 (e.g., 45 Ohm resistors), respectively.

For purposes of illustration, FIG. 9 shows that the pull-down resistors 914 and 916 are selectively coupled to ground via switches 918 and 920, respectively. As discussed in more detail in conjunction with FIG. 10, in some implementations, the switches take the form of a transmit driver. The switches 918 and 920 are controlled by a zero enable signal 922. For example, the value of the zero enable signal may control whether the D+ line 908 or the D− line 910 is driven to ground.

FIG. 9 also illustrates that the USB client device 904 includes pull-up resistors 924 and 926 at a data receiver 934 as discussed herein. Specifically, the pull-up resistors 924 and 926 are selectively coupled to +3.3 V via switches 928 and 930, respectively. The switches 928 and 930 are controlled by an RPU enable signal 932 (e.g., as discussed above in conjunction with FIG. 8).

Figure 10:
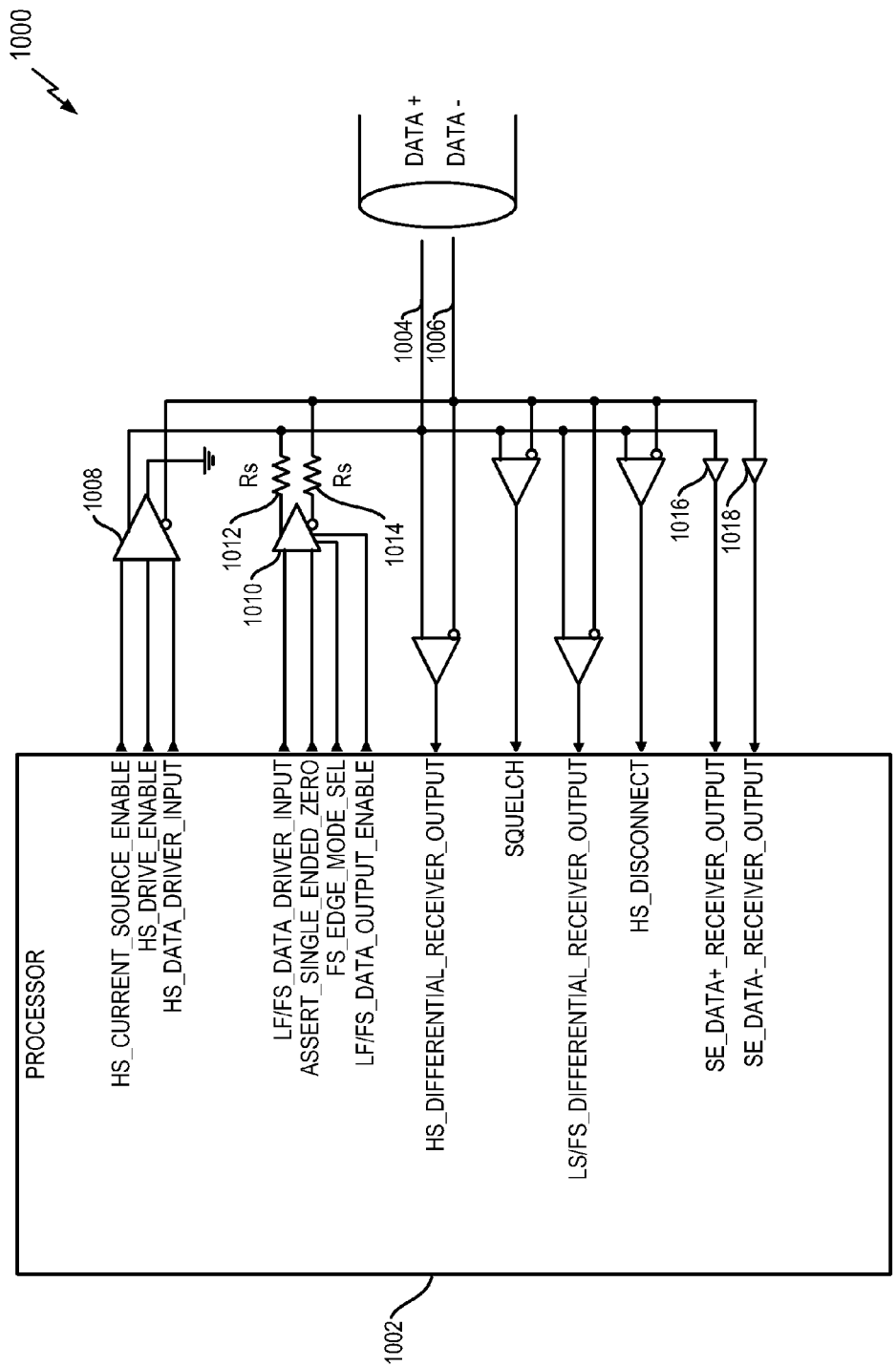
FIG. 10 illustrates an example of a high speed USB transceiver circuit that serves to send and receive signals over a USB bus in accordance with some aspects of the disclosure.

FIG. 10 illustrates an example of a high speed USB transceiver circuit 1000 that provides some of the functionality shown in FIG. 9. The USB transceiver circuit 1000 includes a processor 1002 that communicates via a Data+ (D+) line 1004 and/or a Data− (D−) line 1006 of a USB bus. As shown, the USB transceiver circuit 1000 may be similar to the USB transceiver circuit 800 of FIG. 8. To reduce the complexity of FIG. 10 and avoid repetition, only some of the components of the USB transceiver circuit 1000 will be discussed.

The USB transceiver circuit 1000 includes a high speed current driver 1008 that may correspond to the high speed current driver 912 of FIG. 9. Thus, the high speed current driver 1008 drives high speed data onto the D+ line 1004 and the D− line 1006.

The USB transceiver circuit 1000 also includes a low/full speed driver 1010 and associated series resistors 1012 and 1014 that may provide the functionality of the pull-down resistors 914 and 916 and switches 918 and 920 of FIG. 9. For example, the ASSERT_SINGLE_ENDED_ZERO signal may cause the driver 1010 to drive the D+ line 1004 to GND (e.g., via a 45 Ohm resistor).

FIG. 10 also shows that the USB transceiver circuit 1000 includes receivers 1016 and 1018 that can be used to sense the state (e.g., logic high or logic low) of the D+ line 1004 and the D− line 1006. In this way, the USB transceiver circuit 1000 can determine whether/when to enumerate with another device.

Figure 11:
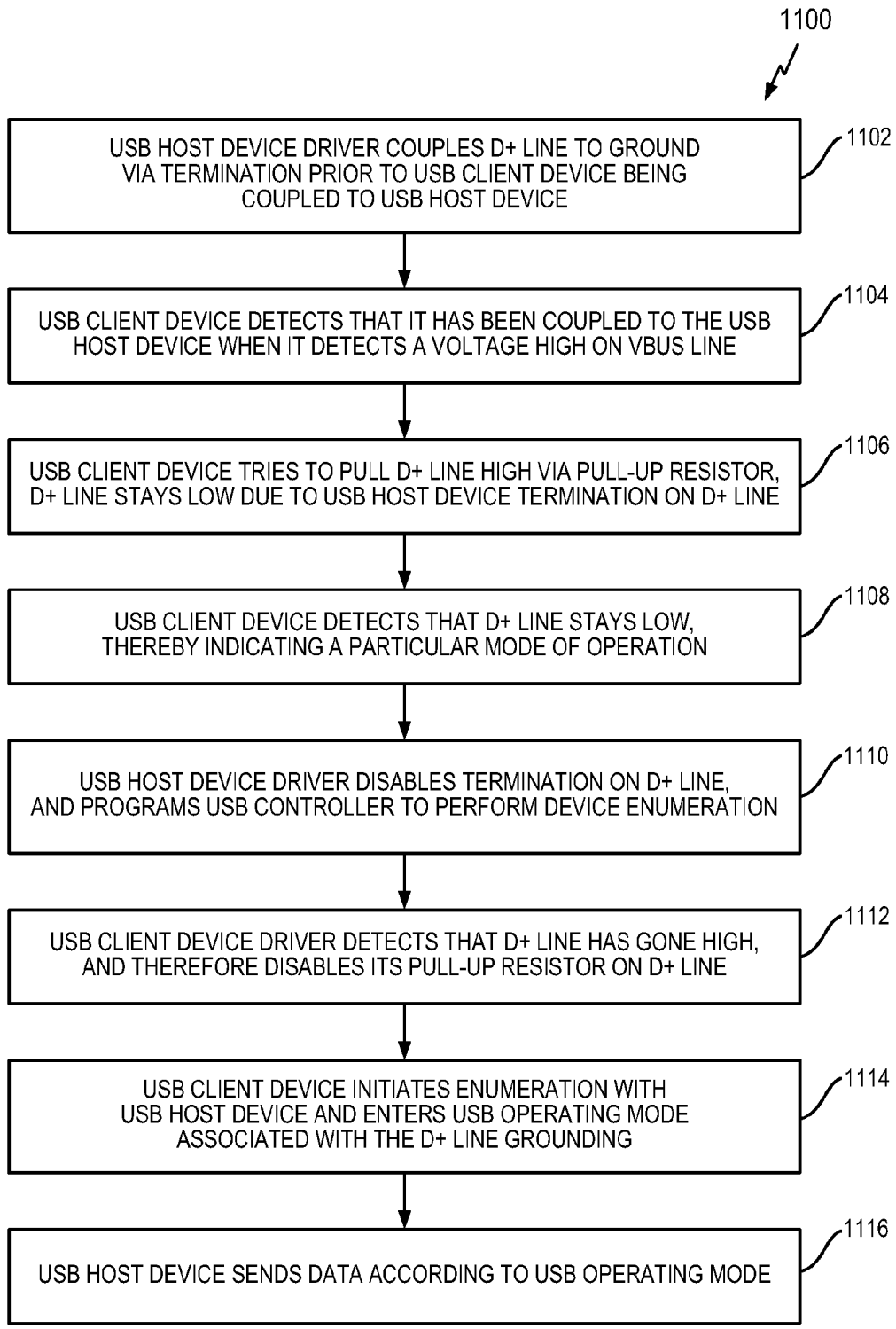
FIG. 11 illustrates a method implemented by a USB host device to put a USB client device into a desired operating mode in accordance with some aspects of the disclosure.

FIG. 11 illustrates a method implemented by a USB host device to put a USB client device into a desired operating mode. The method 1100 may take place within a processing circuit, which may be located in a USB host device (e.g., the USB host device 112 of FIG. 1). Of course, in various aspects within the scope of the disclosure, the method 1100 may be implemented by any suitable apparatus capable of supporting signaling operations.

At block 1102, before the USB client device is coupled (e.g., attached) to the USB host device, the USB host device driver couples the D+ line to ground. For example, the host device driver may turn ON its high speed terminations (e.g., resistors 1012 and 1014 of FIG. 10).

At block 1104, the USB client device detects that it has been attached to the USB host device when it detects a voltage high on VBUS line 1104. The USB client device then tries to pull the D+ line high by enabling a D+ line pull-up (e.g., enables a pull-up resistor on the D+ line) without enabling the USB Link Controller/USB Processor at block 1106. However, the D+ line stays low due to the USB host device termination to ground. Consequently, at block 1108, the USB client device driver detects that the D+ line stays low, thereby indicating a particular mode of operation.

At block 1110, the USB host device driver disables the terminations on the D+ line and programs the USB processor on the host to normal mode to enumerate USB client devices. Upon detecting this condition, the USB client device driver disables the D+ pull-up at block 1112 and programs the USB controller to perform regular enumeration at block 1114. At block 1116, the USB host device enumerates the USB client device, and sends data according to USB operating mode.

Advantageously, the techniques described above in conjunction with FIGS. 9-11 simply involve changes to the USB host and client device driver software. This allows the use of standard USB cables and does not involve any changes to USB host device hardware and software, thereby making this solution backwards compatible with existing hardware and software.

Other Aspects

Figure 12:
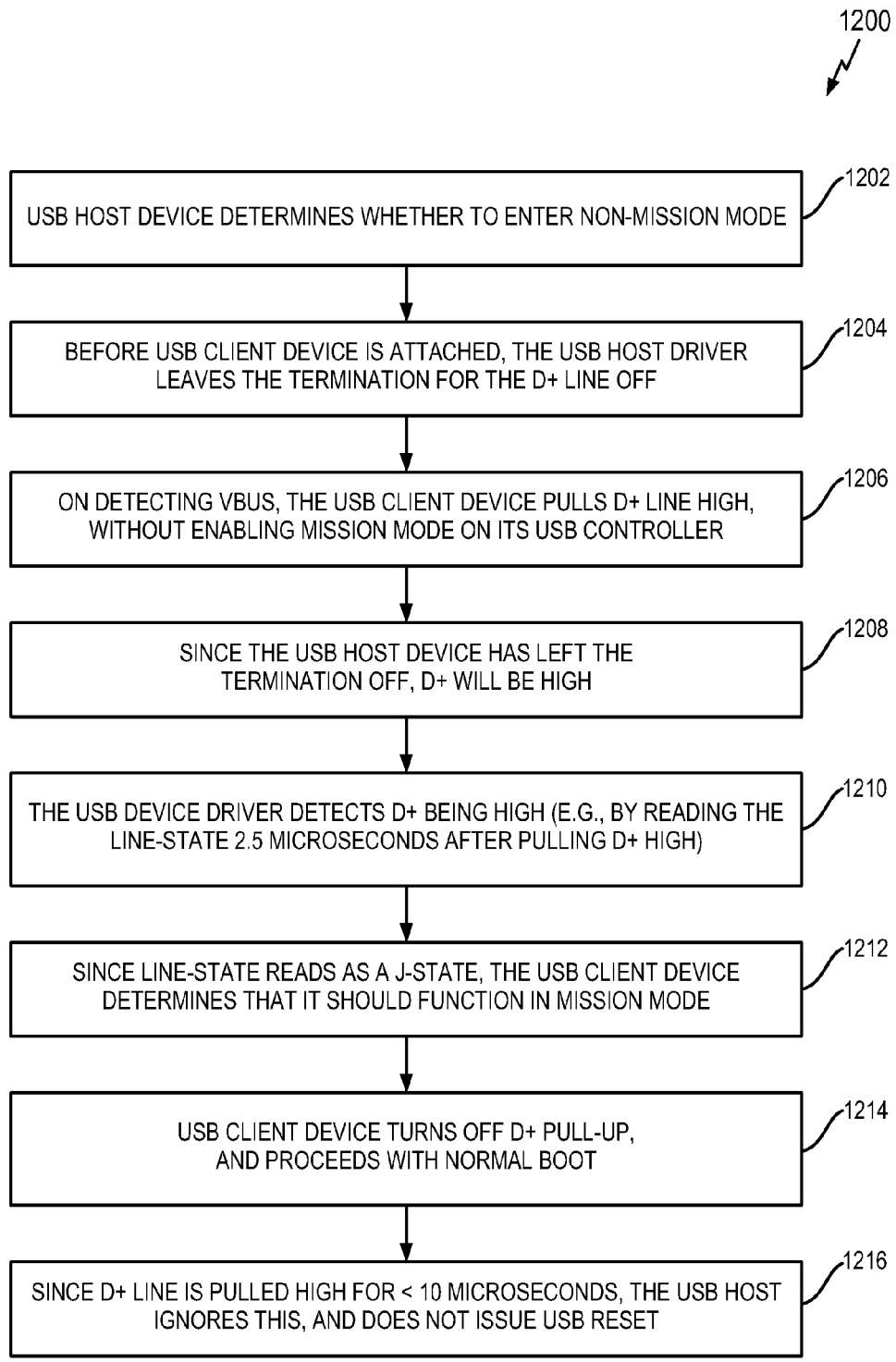
FIG. 12 illustrates a method implemented by a USB host device to invoke a mission mode of operation.

In the case when the USB host device does not enforce a non-mission mode, the operations of FIG. 12 can be performed. Initially, at block 1202, the USB host device determines whether to enter non-mission mode. For example, non-mission mode may be selected by an operator by providing appropriate input via a user input device of the USB host device. In the event an operator has selected a non-mission mode, the USB host device may proceed with the operations of FIG. 11. In contrast, in the event an operator has not selected a non-mission mode, the USB host device may proceed with the operations of FIG. 12.

At block 1204, before the USB client device is attached, the USB host driver leaves the terminations OFF. At block 1206, upon detecting VBUS, the USB client device (e.g., device driver) pulls D+ high (enables Rpu on D+) in the USB PHY, without enabling mission mode on the USB link controller. Since the USB Host has the terminations OFF, D+ stays HIGH at block 1208.

At block 1210, the USB device driver detects this condition (i.e., D+ staying HIGH) by reading the line-state after 2.5 microseconds from block 1206.

At block 1212, since the line-state reads as a USB J-State, the USB device driver determines that the USB client device should function in mission mode. Consequently, the USB device driver turns off the D+ pull-up, and proceeds with normal boot at block 1214. Advantageously, normal boot time is not extended. Moreover, since D+ may be pulled HIGH for <10 us, the USB Host ignores this, and does not issue USB reset (block 1216).

Figure 13:
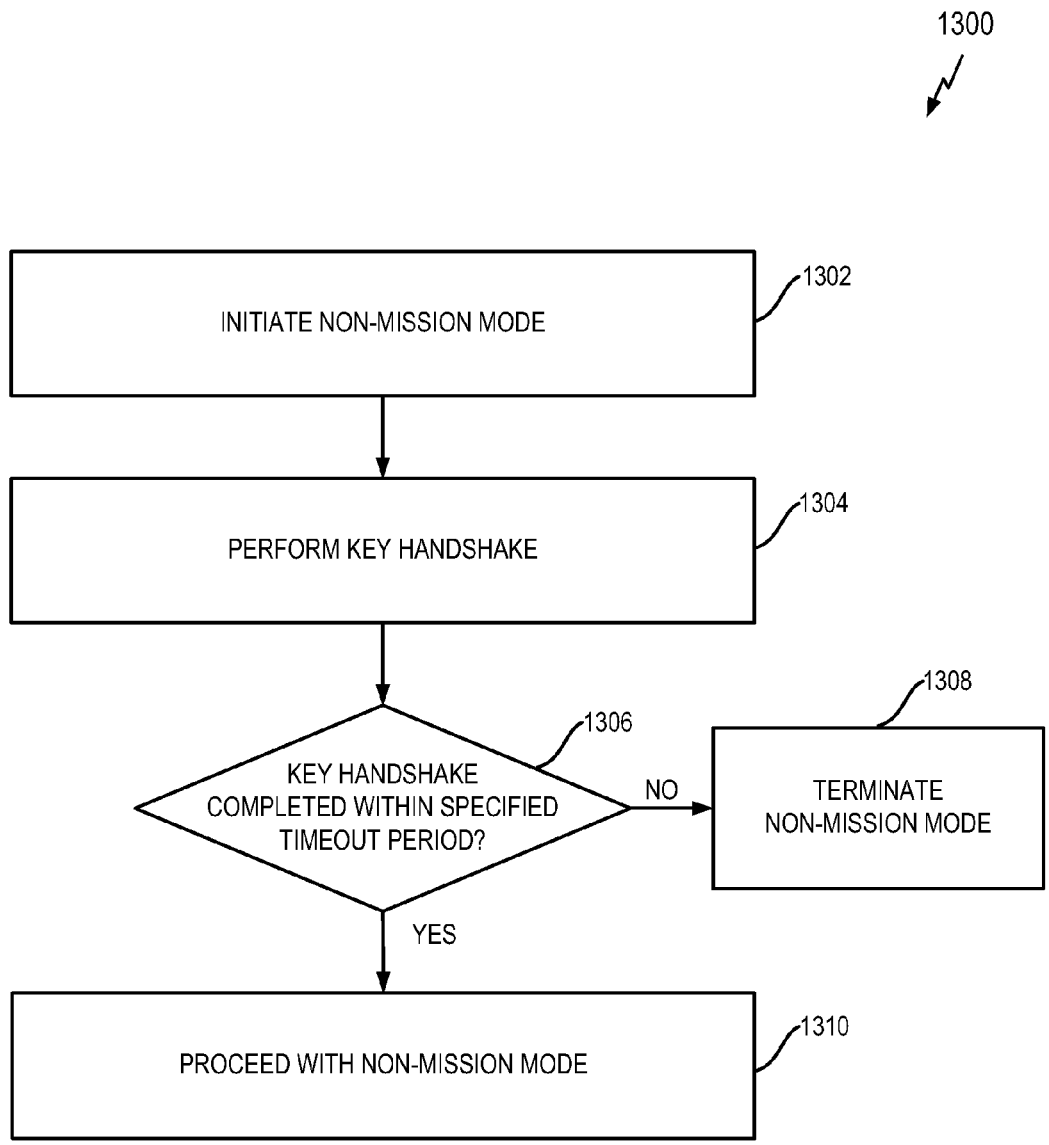
FIG. 13 illustrates a key handshake method in accordance with some aspects of the disclosure.

In the techniques taught herein, a key-handshake mechanism may be used to make these techniques secure for further data transfers in non-mission mode. FIG. 13 illustrates an example of a method 1300 for such a key-handshake. The method 1300 may take place within a processing circuit, which may be located in a USB client device and/or a USB host device (e.g., the USB client device 102 and the USB host device 112 of FIG. 1). Of course, in various aspects within the scope of the disclosure, the method 1300 may be implemented by any suitable apparatus capable of supporting signaling operations.

At block 1302, a non-mission mode is initiated. For example, a USB client device may perform the operations of FIG. 3 and/or a USB host device may perform the operations of FIG. 11.

At block 1304, a key handshake is performed. For example, a USB client device may communicate with a USB host device to determine whether a measure of trust can be established between the devices.

At block 1306, a determination is made as to whether the key handshake is completed within a specified time period. At block 1308, the USB client device and/or the USB host device terminates (exits) the non-mission mode if successful key exchange is not accomplished within a specified timeout period. Conversely, if the key exchange is accomplished within the specified timeout period, the device proceeds with non-mission mode at block 1310 (e.g., using the keys to authenticate and/or secure any data transmissions).

Figure 14:
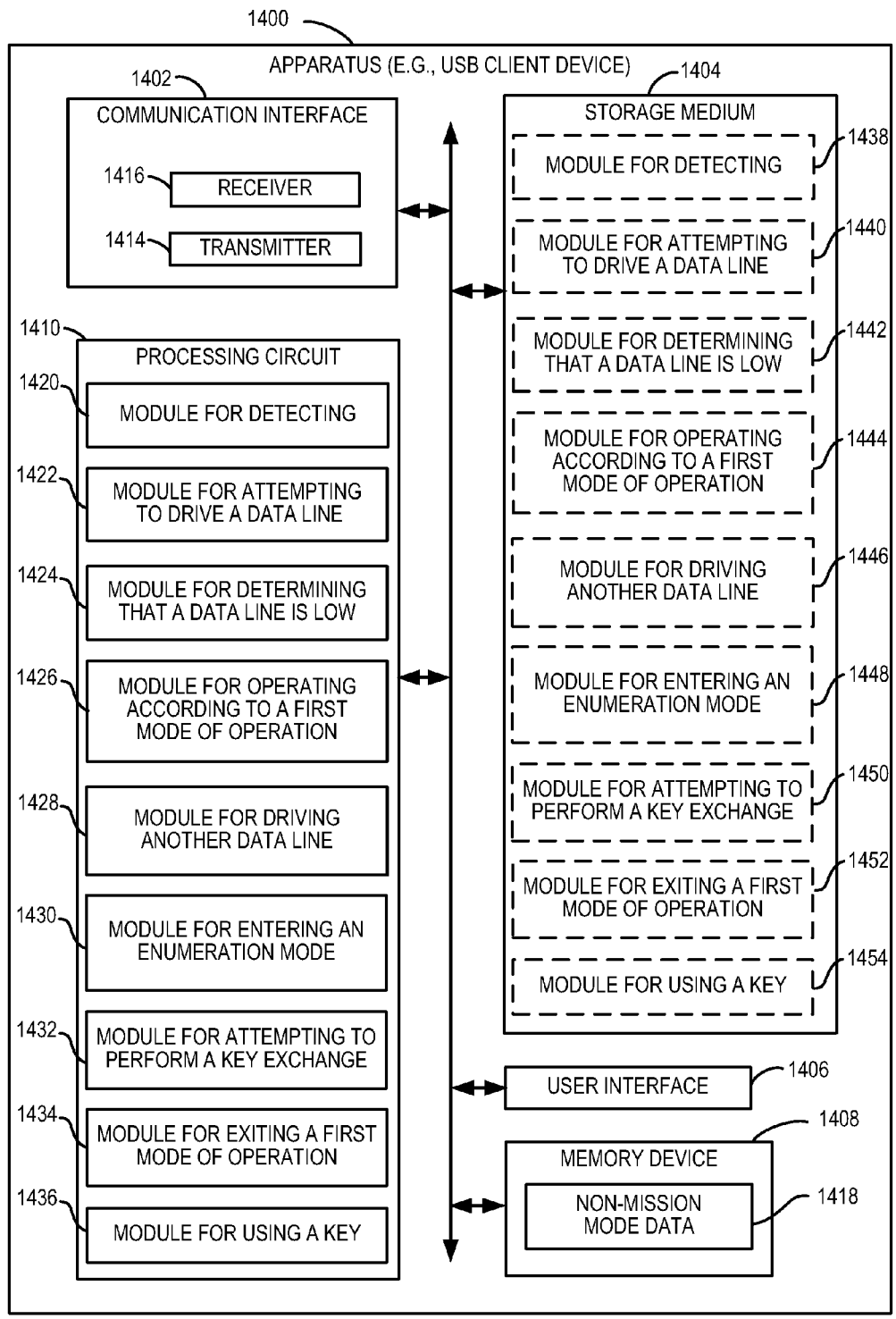
FIG. 14 is a block diagram illustrating select components of an apparatus configured to provide mode of operation functionality in accordance with some aspects of the disclosure.

Turning now to FIG. 14, a block diagram is shown illustrating select components of an apparatus 1400 according to at least one example of the disclosure. The apparatus 1400 (e.g., a USB client device) includes a communication interface 1402 (e.g., an external bus interface), a storage medium 1404, a user interface 1406, a memory device 1408, and a processing circuit 1410. The processing circuit 1410 is coupled to or placed in electrical communication with each of the communication interface 1402, the storage medium 1404, the user interface 1406, and the memory device 1408.

The communication interface 1402 provides an interface for the components of the apparatus 1400 to external components. The communication interface 1402 may include, for example, one or more of: signal driver circuits, signal receiver circuits, amplifiers, signal filters, signal buffers, or other circuitry used to interface with a signaling bus or other types of signaling media. In some aspects, the communication interface 1402 includes a transmitter 1414 and a receiver 1416. In some implementations, the communication interface 1402 is a USB interface.

The processing circuit 1410 is arranged to obtain, process and/or send data, control data access and storage, issue commands, and control other desired operations. The processing circuit 1410 may include circuitry adapted to implement desired programming provided by appropriate media in at least one example. In some instances, the processing circuit 1410 may include circuitry adapted to perform a desired function, with or without implementing programming By way of example, the processing circuit 1410 may be implemented as one or more processors, one or more controllers, and/or other structure configured to execute executable programming and/or perform a desired function. Examples of the processing circuit 1410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

The processing circuit 1410 is adapted for processing, including the execution of programming, which may be stored on the storage medium 1404. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 1410 may include one or more of: a module for detecting 1420, a module for attempting to drive a data line 1422, a module for determining that a data line is low 1424, a module for operating according to a first mode of operation 1426, a module for driving another data line 1428, a module for entering an enumeration mode 1430, a module for attempting to perform a key exchange 1432, a module for exiting a first mode of operation 1434, or a module for using a key 1436.

The module for detecting 1420 may include circuitry and/or programming (e.g., a module for detecting 1438 stored on the storage medium 1404) adapted to detect that a device has been coupled. For example, in some implementations, information indicating a signal level on a line (e.g., detection of a supply voltage on a data line) is received. This information can, for example, be directly received from a circuit (e.g., a receiver) that "senses" the line or indirectly received from another circuit (e.g., the memory device 1408). Based on the received information, an indication of detection is generated. This indication is then output (e.g., stored in the memory device 1408 or passed to another component).

The module for attempting to drive a data line 1422 may include circuitry and/or programming (e.g., a module for attempting to drive a data line 1440 stored on the storage medium 1404) adapted to cause an attempt to drive a data line to at least one signal level. For example, in some implementations, an indication to drive the data line (e.g., a D+ line) to a particular signal level (e.g., a logic high) is received (e.g., from the memory device 1408 or another component). In some implementations, in response to receiving this indication, a signal is sent to a circuit (e.g., a register) that controls a switch that selectively causes the data line to be "pulled-up" by a pull-up resistor.

The module for determining that a data line is low 1424 may include circuitry and/or programming (e.g., a module for determining that a data line is low 1442 stored on the storage medium 1404) adapted to determine whether a signal level on the data line is at a logic low. For example, in some implementations, information indicating the signal level on the data line (e.g., information indicating that the data line was at a logic low when attempting to drive the data line to a logic high) is received. This information can, for example, be directly received from a circuit (e.g., a receiver) that "senses" the data line or indirectly received from another circuit (e.g., the memory device 1408). Based on the received information, an indication of the state of the data line is generated. This indication is then output (e.g., stored in the memory device 1408 or passed to another component).

The module for operating according to a first mode of operation 1426 may include circuitry and/or programming (e.g., a module for operating according to a first mode of operation 1444 stored on the storage medium 1404) adapted to perform operations associated with a particular mode of operation. For example, in some implementations, information indicating that the particular mode of operation is to be invoked (e.g., information indicating that a data line was at a logic low when attempting to drive the data line to a logic high) is received. This information can be received, for example, from the memory device 1408 or some other component. Based on this information, operations associated with the particular mode of operation (e.g., a debug mode, a logging mode, a provisioning mode, or a combination of these modes) are performed.

The module for driving another data line 1428 may include circuitry and/or programming (e.g., a module for driving another data line 1446 stored on the storage medium 1404) adapted to cause at least one signal level to be driven onto a data line. For example, in some implementations, an indication to drive the data line (e.g., a D– line) to a particular signal level (e.g., a logic high) is received (e.g., from the memory device 1408 or another component). In some implementations, in response to receiving this indication, a signal is sent to a circuit (e.g., a register) that controls a driver that selectively causes the data line to be driven to a logic high.

The module for entering an enumeration mode 1430 may include circuitry and/or programming (e.g., a module for entering an enumeration mode 1448 stored on the storage medium 1404) adapted to perform operations associated with an enumeration mode of operation. For example, in some implementations, information indicating that the enumeration mode of operation is to be entered (e.g., information indicating that a first mode of operation, such as a non-mission mode, has completed) is received. This information can be received, for example, from the memory device 1408 or some other component. Based on this information, operations associated with the enumeration mode of operation (e.g., a USB enumeration mode) are invoked.

The module for attempting to perform a key exchange 1432 may include circuitry and/or programming (e.g., a module for attempting to perform a key exchange 1450 stored on the storage medium 1404) adapted to perform a key exchange with another device, such as a USB-compatible host device. For example, in some implementations, information indicating that the key exchange should be commenced (e.g., information indicating that a first mode of operation, such as a non-mission mode, has been initiated) is received. This information can be received, for example, from the memory device 1408 or some other component. As a result of receiving this information, messages associated with a key exchange are sent to and received from the other device.

The module for exiting a first mode of operation 1434 may include circuitry and/or programming (e.g., a module for exiting a first mode of operation 1452 stored on the storage medium 1404) adapted to perform operations associated with exiting a particular mode of operation (e.g., a debug mode, a logging mode, a provisioning mode, or a combination of these modes). For example, in some implementations, information indicating that a key exchange has not been completed (e.g., within a specified period of time) is received. This information can be received, for example, from the memory device 1408 or some other component. Based on this information, operations associated with the particular mode of operation are terminated.

The module for using a key 1436 may include circuitry and/or programming (e.g., a module for using a key 1454 stored on the storage medium 1404) adapted to secure communication between devices, such as a USB-compatible client device and a USB-compatible host device. For example, in some implementations, information indicating that a key exchange has been successfully completed is received. This information can be received, for example, from the memory device 1408 or some other component. As a result of receiving this information, the key is used to secure (e.g., encrypt, decrypt, cryptographically sign, cryptographically verify, etc.) messages sent between the devices.

The storage medium 1404 may represent one or more processor-readable devices for storing programming, electronic data, databases, or other digital information. The storage medium 1404 may also be used for storing data that is manipulated by the processing circuit 1410 when executing programming. The storage medium 1404 may be any available media that can be accessed by the processing circuit 1410, including portable or fixed storage devices, optical storage devices, and various other mediums capable of storing, containing and/or carrying programming. By way of example and not limitation, the storage medium 1404 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where the storage medium 1404 is integral to the processing circuit 1410 and/or examples where the storage medium 1404 is separate from the processing circuit 1410.

Programming stored by the storage medium 1404, when executed by the processing circuit 1410, causes the processing circuit 1410 to perform one or more of the various functions and/or process steps described herein. For example, the storage medium 1404 may include one or more of: the module for detecting 1438, the module for attempting to drive a data line 1440, the module for determining that a data line is low 1442, the module for operating according to a first mode of operation 1444, the module for driving another data line 1446, the module for entering an enumeration mode 1448, the module for attempting to perform a key exchange 1450, the module for exiting a first mode of operation 1452, or the module for using a key 1454.

Thus, according to one or more aspects of the disclosure, the processing circuit 1410 is adapted to perform (in conjunction with the storage medium 1404) any or all of the processes, functions, steps and/or routines for any or all of the apparatuses described herein. As used herein, the term "adapted" in relation to the processing circuit 1410 may refer to the processing circuit 1410 being one or more of configured, employed, implemented, and/or programmed (in conjunction with the storage medium 1404) to perform a particular process, function, step and/or routine according to various features described herein.

The memory device 1408 may represent one or more memory devices and may comprise any of the memory technologies listed above or any other suitable memory technology. The memory device 1408 may store non-mission mode-related data 1418, along with other information used by one or more of the components of the apparatus 1400. The memory device 1408 also may be used for storing data that is manipulated by the processing circuit 1410 or some other component of the apparatus 1400. In some implementations, the memory device 1408 and the storage medium 1404 are implemented as a common memory component.

The user interface 1406 includes functionality that enables a user to interact with the apparatus 1400. For example, the user interface 1406 may comprise or interface with one or more user output devices (e.g., a display device, etc.) and one or more user input devices (e.g., a keyboard, a tactile input device, etc.).

With the above in mind, examples of operations relating to triggering a mode of operation according to the disclosure will be described in more detail in conjunction with the flowcharts of FIGS. 15 and 16. For convenience, the operations of FIGS. 15 and 16 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 15:
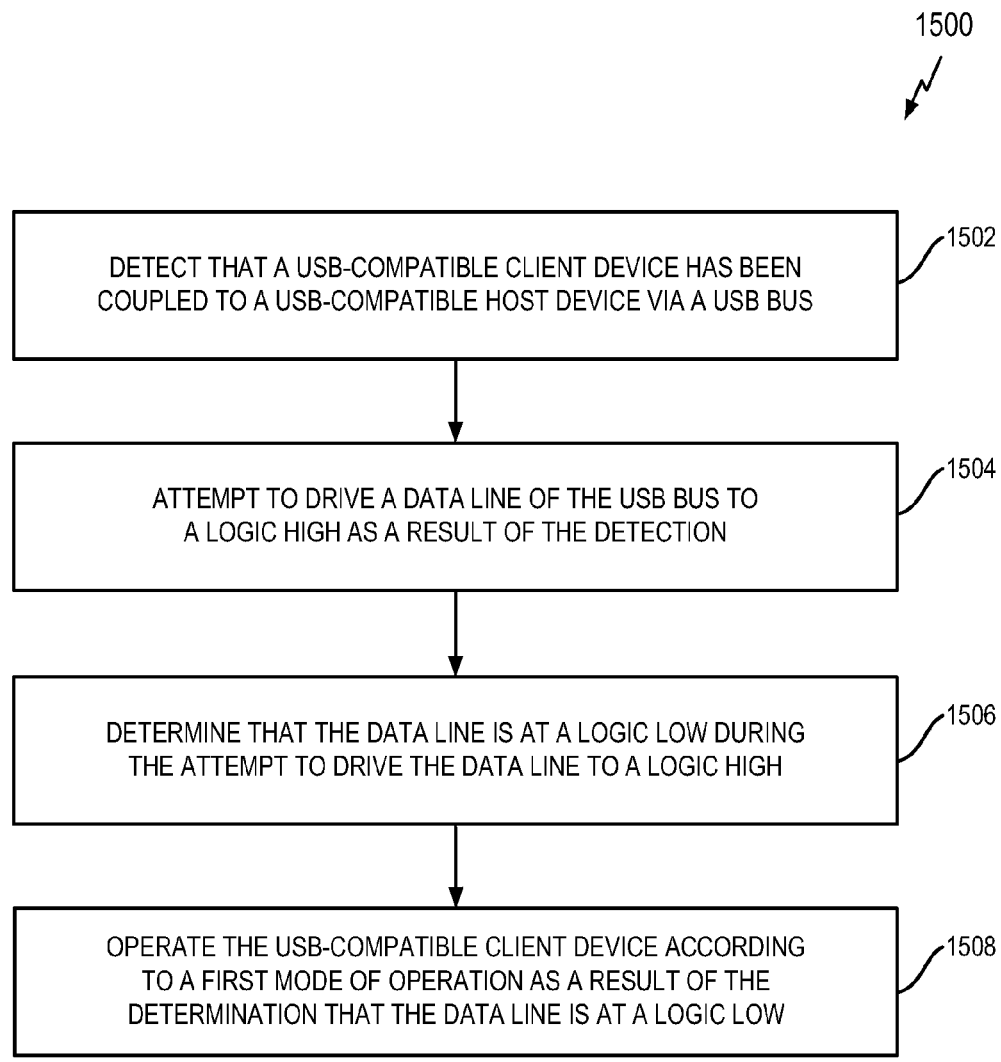
FIG. 15 is a flowchart illustrating a method of triggering a mode of operation in accordance with some aspects of the disclosure.

FIG. 15 illustrates a method 1500 for triggering a USB-compatible client device to operate in a desired mode of operation in accordance with some aspects of the disclosure. In various aspects within the scope of the disclosure, the method 1500 may be implemented by a USB-compatible client device or any other suitable apparatus capable of supporting signaling operations.

At block 1502, a detection is made relating to whether USB-compatible client device has been coupled to a USB-compatible host device via a USB bus. As discussed herein, in some aspects this involves detecting the presence of a voltage (e.g., a power supply voltage level) on a power line of the USB bus.

At block 1504, as a result of the detection of block 1502, an attempt is made to drive a data line of the USB bus to a logic high. In some aspects, the data line is a USB D+ line. In some aspects, a logic high is a value representative of a logic high signaling level (e.g., as opposed to a logic low signaling level). Such a level can be represented by a designated voltage level (e.g., greater than 2.0 volts, greater than 2.5 volts, up to the power supply limit, etc.). It should be appreciated that different voltage values can be used in different communication technologies.

In some aspects, the data line is driven to a logic high for a period of time that is less than a reset time period (e.g., for a USB bus reset).

At block 1506, a determination is made that the data line is at a logic low during the attempt to drive the data line to a logic high, thereby indicating that the USB-compatible client device is to enter a first mode of operation. In some aspects, a logic low is a value representative of a logic low signaling level (e.g., as opposed to a logic high signaling level). Such a level can be represented by a designated voltage level (e.g., less than 0.5 volts, less than 0.8 volts, down to ground or a power supply limit, etc.). It should be appreciated that different voltage values can be used in different communication technologies.

In some aspects, the determination that the data line is at a logic low is performed within a threshold period of time after detecting that the USB-compatible client device has been coupled to the USB-compatible host device. In some aspects, the data line is driven to a logic low prior to the USB-compatible client device being coupled to the USB-compatible host device. In some aspects, the data line is driven to a logic low by externally coupling the data line to ground. In some aspects, the data line is driven to a logic low by a switch on the USB bus that couples the data line to a ground line. In some aspects, the data line is driven to a logic low at a transmit driver of the USB-compatible host device.

At block 1508, as a result of the determination of block 1506, the USB-compatible client device is operated according to the first mode of operation. In some aspects, the first mode of operation comprises a non-mission mode such as a debug mode, a logging mode, or a provisioning mode.

Figure 16:
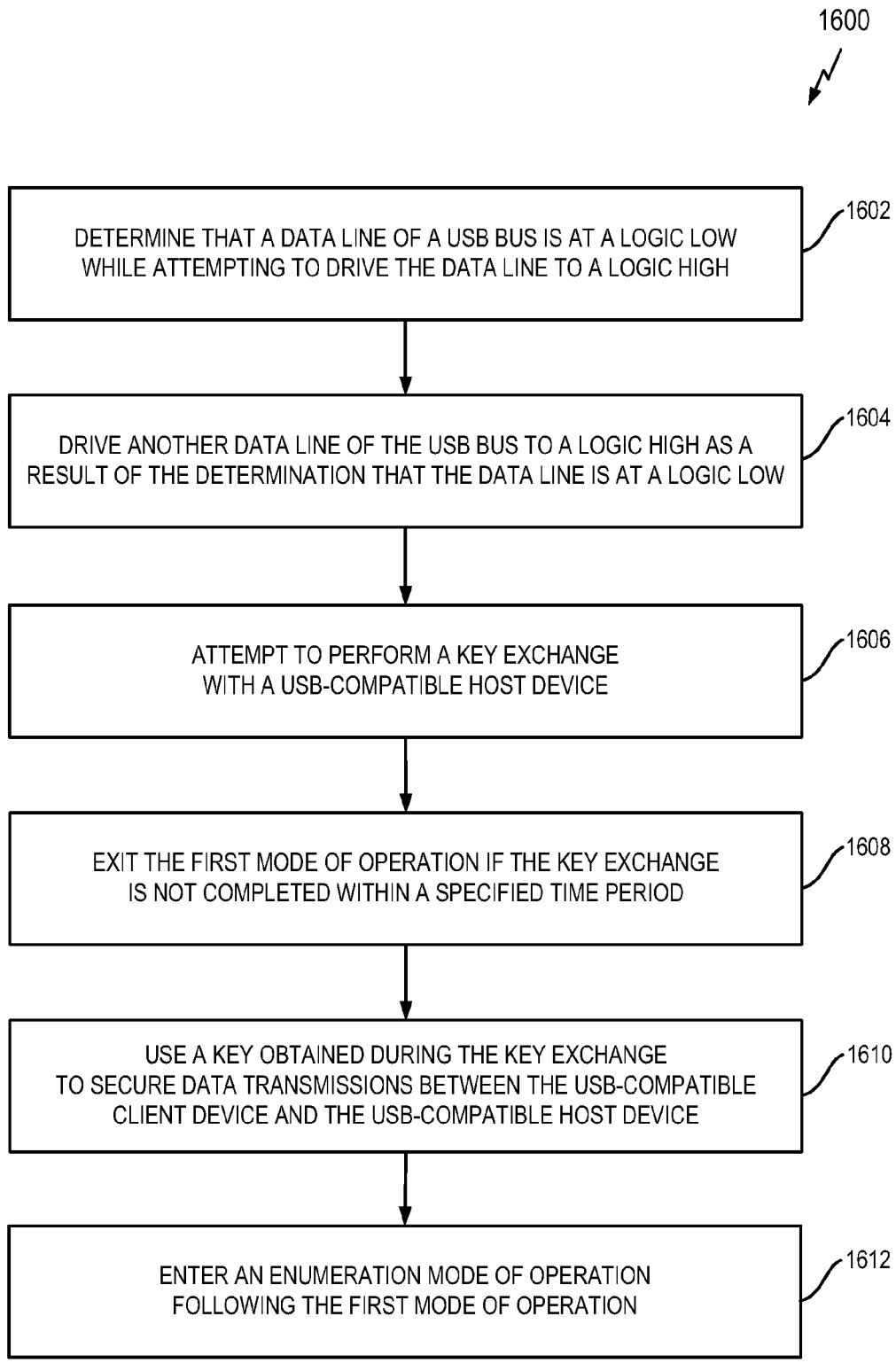
FIG. 16 is a flowchart illustrating additional aspects of a method of triggering a mode of operation in accordance with some aspects of the disclosure.

FIG. 16 is a method 1600 illustrating additional aspects relating to triggering a USB-compatible client device to operate in a desired mode of operation in accordance with some aspects of the disclosure. In various aspects within the scope of the disclosure, the method 1600 may be implemented by a USB-compatible client device or any other suitable apparatus capable of supporting signaling operations.

At block 1602, a determination is made that a data line is at a logic low during an attempt to drive the data line to a logic high. In some aspects, the operations of block 1602 may correspond to the operations of blocks 1502-1506 of FIG. 15.

At optional block 1604, another data line of the USB bus is driven to a logic high as a result of the determination that the data line is at a logic low. In some aspects, the other data line is a USB D− line. In some aspects, operating the USB-compatible client device according to the first mode of operation is triggered as a result of driving the other data line to a logic high. In some aspects, the other data line is driven to a logic high within a threshold period of time after detecting that the USB-compatible client device has been coupled to the USB-compatible host device.

At optional block 1606, an attempt is made to perform a key exchange with the USB-compatible host device.

At optional block 1608, the first mode of operation is exited if the key exchange is not completed within a specified time period At optional block 1610, if the key exchange is successfully completed (e.g., within a specified time period), a key obtained during the key exchange is used to secure data transmissions between the USB-compatible client device and the USB-compatible host device.

At optional block 1612, an enumeration mode of operation is entered following the first mode of operation.

Figure 17:
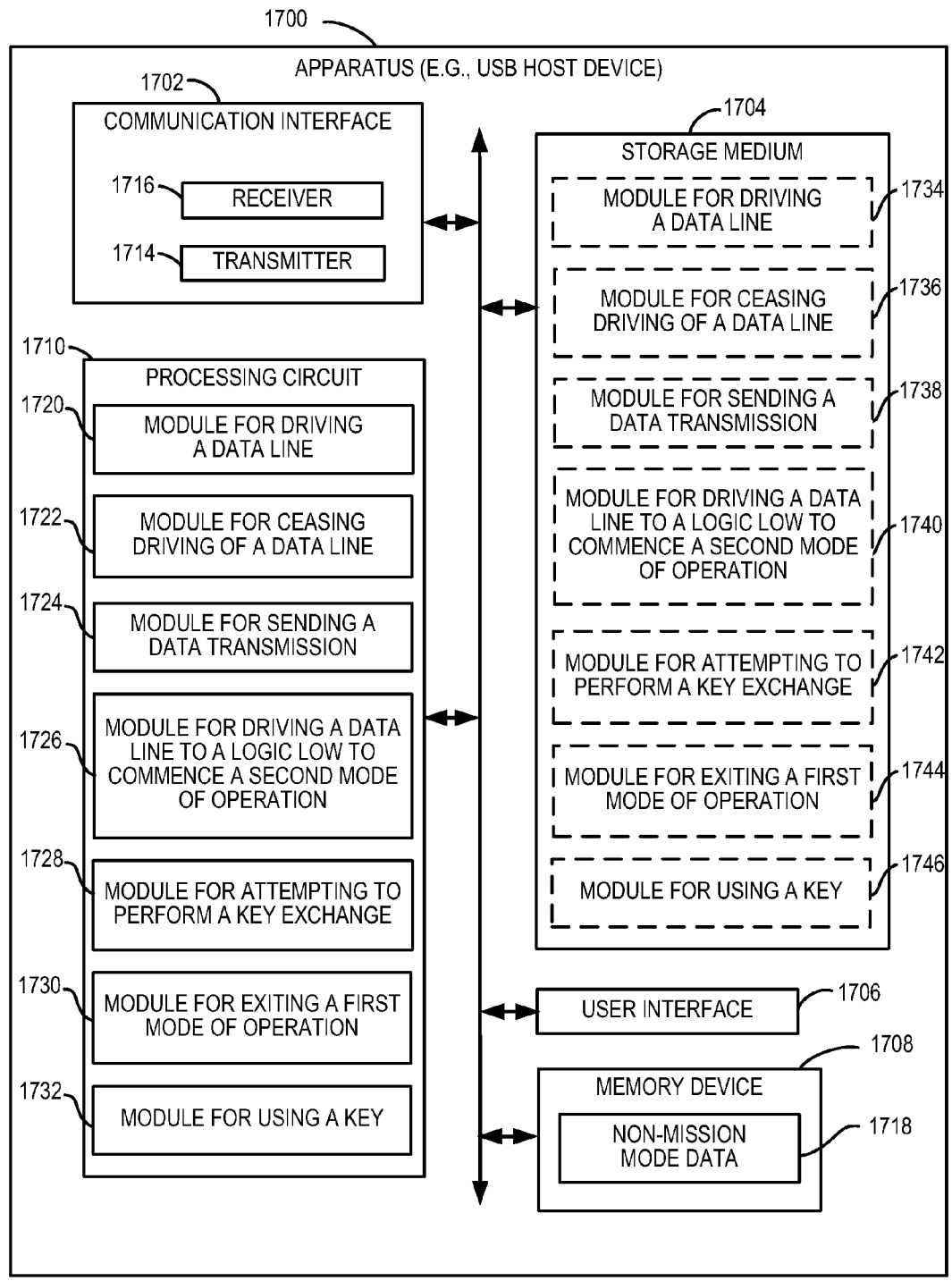
FIG. 17 is a block diagram illustrating select components of an apparatus configured to provide mode of operation functionality in accordance with some aspects of the disclosure.

FIG. 17 is a block diagram illustrating select components of an apparatus 1700 according to at least one example of the disclosure. The apparatus 1700 (e.g., a USB host device) includes a communication interface 1702 (e.g., an external bus interface), a storage medium 1704, a user interface 1706, a memory device 1708, and a processing circuit 1710. The processing circuit 1710 is coupled to or placed in electrical communication with each of the communication interface 1702, the storage medium 1704, the user interface 1706, and the memory device 1708.

The communication interface 1702 provides an interface for the components of the apparatus 1700 to external components. The communication interface 1702 may include, for example, one or more of: signal driver circuits, signal receiver circuits, amplifiers, signal filters, signal buffers, or other circuitry used to interface with a signaling bus or other types of signaling media. In some aspects, the communication interface 1702 includes a transmitter 1714 and a receiver 1716. In some implementations, the communication interface 1702 is a USB interface.

The processing circuit 1710 is arranged to obtain, process and/or send data, control data access and storage, issue commands, and control other desired operations. The processing circuit 1710 may include circuitry adapted to implement desired programming provided by appropriate media in at least one example. In some instances, the processing circuit 1710 may include circuitry adapted to perform a desired function, with or without implementing programming By way of example, the processing circuit 1710 may be implemented as one or more processors, one or more controllers, and/or other structure configured to execute executable programming and/or perform a desired function. Examples of the processing circuit 1710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1710 are for illustration and other suitable configurations within the scope of the disclosure are also contemplated.

The processing circuit 1710 is adapted for processing, including the execution of programming, which may be stored on the storage medium 1704. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 1710 may include one or more of: a module for driving a data line 1720, a module for ceasing driving of a data line 1722, a module for sending a data transmission 1724, a module for driving a data line to a logic low to commence a second mode of operation 1726, a module for attempting to perform a key exchange 1728, a module for exiting a first mode of operation 1730, or a module for using a key 1732.

The module for driving a data line 1720 may include circuitry and/or programming (e.g., a module for driving a data line 1734 stored on the storage medium 1704) adapted to cause at least one signal level to be driven onto a data line. For example, in some implementations, an indication to drive the data line (e.g., a D+ line) to a particular signal level (e.g., a logic low) is received (e.g., from the memory device 1408 or another component). Such an indication can originate, for example, as a result of user input to commence a non-mission mode. In some implementations, in response to receiving this indication, a signal is sent to a circuit (e.g., a register) that controls a driver that selectively causes the data line to be driven to a logic low (e.g., couples the data line to ground directly or via a resistor).

The module for ceasing driving of a data line 1722 may include circuitry and/or programming (e.g., a module for ceasing driving of a data line 1736 stored on the storage medium 1704) adapted to cause at least one signal level to cease being driven onto a data line. For example, in some implementations, an indication to stop driving the data line (e.g., a D+ line) to a particular signal level (e.g., a logic low) is received (e.g., from the memory device 1408 or another component). Such an indication can originate, for example, in response to a specified event (e.g., expiration of a timer or receipt of a signal on a data line) that occurs after the coupling of USB-compatible devices. In some implementations, in response to receiving this indication, a signal is sent to a circuit (e.g., a register) that controls a driver that selectively controls whether the data line to be driven to a logic low. Thus, application of this signal may be used to cause the data line to cease being driven to a logic low.

The module for sending a data transmission 1724 may include circuitry and/or programming (e.g., a module for sending a data transmission 1738 stored on the storage medium 1704) adapted to send data. Initially, data to be transmitted is obtained. For example, this data may be obtained from the memory device 1708 or some other component. In some implementations, the module for sending a data transmission 1724 processes (e.g., encodes) the data to be sent. The module for sending a data transmission 1724 then causes the data to be sent over a designated medium (e.g., over a USB bus). For example, the module for sending a data transmission 1724 can pass the data to the transmitter 1714. In some implementations, the data is sent according to (e.g., during) a first mode of operation that is indicated by (e.g., associated with) the driving of a data line to a logic low.

The module for driving a data line to a logic low to commence a second mode of operation 1726 may include circuitry and/or programming (e.g., a module for driving a data line to a logic low to commence a second mode of operation 1740 stored on the storage medium 1704) adapted to cause a signal level associated with a logic low to be driven onto a data line. For example, in some implementations, an indication to commence the second mode of operation (e.g., an indication that the first mode of operation is complete) is received (e.g., from the memory device 1408 or another component). In some implementations, in response to receiving this indication, a signal is sent to a circuit (e.g., a register) that controls a driver that selectively causes the data line to be driven to a logic low.

The module for attempting to perform a key exchange 1728 may include circuitry and/or programming (e.g., a module for attempting to perform a key exchange 1742 stored on the storage medium 1704) adapted to perform a key exchange with another device, such as a USB-compatible client device. For example, in some implementations, information indicating that the key exchange should be commenced (e.g., information indicating that a first mode of operation, such as a non-mission mode, has been initiated) is received. This information can be received, for example, from the memory device 1708 or some other component. As a result of receiving this information, messages associated with a key exchange are sent to and received from the other device.

The module for exiting a first mode of operation 1730 may include circuitry and/or programming (e.g., a module for exiting a first mode of operation 1744 stored on the storage medium 1704) adapted to perform operations associated with exiting a particular mode of operation (e.g., a debug mode, a logging mode, a provisioning mode, or a combination of these modes). For example, in some implementations, information indicating that a key exchange has not been completed (e.g., within a specified period of time) is received. This information can be received, for example, from the memory device 1708 or some other component. Based on this information, operations associated with the particular mode of operation are terminated.

The module for using a key 1732 may include circuitry and/or programming (e.g., a module for using a key 1746 stored on the storage medium 1704) adapted to secure communication between devices, such as a USB-compatible client device and a USB-compatible host device. For example, in some implementations, information indicating that a key exchange has been successfully completed is received. This information can be received, for example, from the memory device 1708 or some other component. As a result of receiving this information, the key is used to secure (e.g., encrypt, decrypt, cryptographically sign, cryptographically verify, etc.) messages sent between the devices.

The storage medium 1704 may represent one or more processor-readable devices for storing programming, electronic data, databases, or other digital information. The storage medium 1704 may also be used for storing data that is manipulated by the processing circuit 1710 when executing programming. The storage medium 1704 may be any available media that can be accessed by the processing circuit 1710, including portable or fixed storage devices, optical storage devices, and various other mediums capable of storing, containing and/or carrying programming By way of example and not limitation, the storage medium 1704 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 1704 may be coupled to the processing circuit 1710 such that the processing circuit 1710 can read information from, and write information to, the storage medium 1704. That is, the storage medium 1704 can be coupled to the processing circuit 1710 so that the storage medium 1704 is at least accessible by the processing circuit 1710, including examples where the storage medium 1704 is integral to the processing circuit 1710 and/or examples where the storage medium 1704 is separate from the processing circuit 1710.

Programming stored by the storage medium 1704, when executed by the processing circuit 1710, causes the processing circuit 1710 to perform one or more of the various functions and/or process steps described herein. For example, the storage medium 1704 may include one or more of: the module for driving a data line 1734, the module for ceasing driving of a data line 1736, the module for sending a data transmission 1738, the module for driving a data line to a logic low to commence a second mode of operation 1740, the module for attempting to perform a key exchange 1742, the module for exiting a first mode of operation 1744, or the module for using a key 1746.

Thus, according to one or more aspects of the disclosure, the processing circuit 1710 is adapted to perform (in conjunction with the storage medium 1704) any or all of the processes, functions, steps and/or routines for any or all of the apparatuses described herein. As used herein, the term "adapted" in relation to the processing circuit 1710 may refer to the processing circuit 1710 being one or more of configured, employed, implemented, and/or programmed (in conjunction with the storage medium 1704) to perform a particular process, function, step and/or routine according to various features described herein.

The memory device 1708 may represent one or more memory devices and may comprise any of the memory technologies listed above or any other suitable memory technology. The memory device 1708 may store non-mission mode-related data 1718, along with other information used by one or more of the components of the apparatus 1700. The memory device 1708 also may be used for storing data that is manipulated by the processing circuit 1710 or some other component of the apparatus 1700. In some implementations, the memory device 1708 and the storage medium 1704 are implemented as a common memory component.

The user interface 1706 includes functionality that enables a user to interact with the apparatus 1700. For example, the user interface 1706 may comprise or interface with one or more user output devices (e.g., a display device, etc.) and one or more user input devices (e.g., a keyboard, a tactile input device, etc.).

Figure 18:
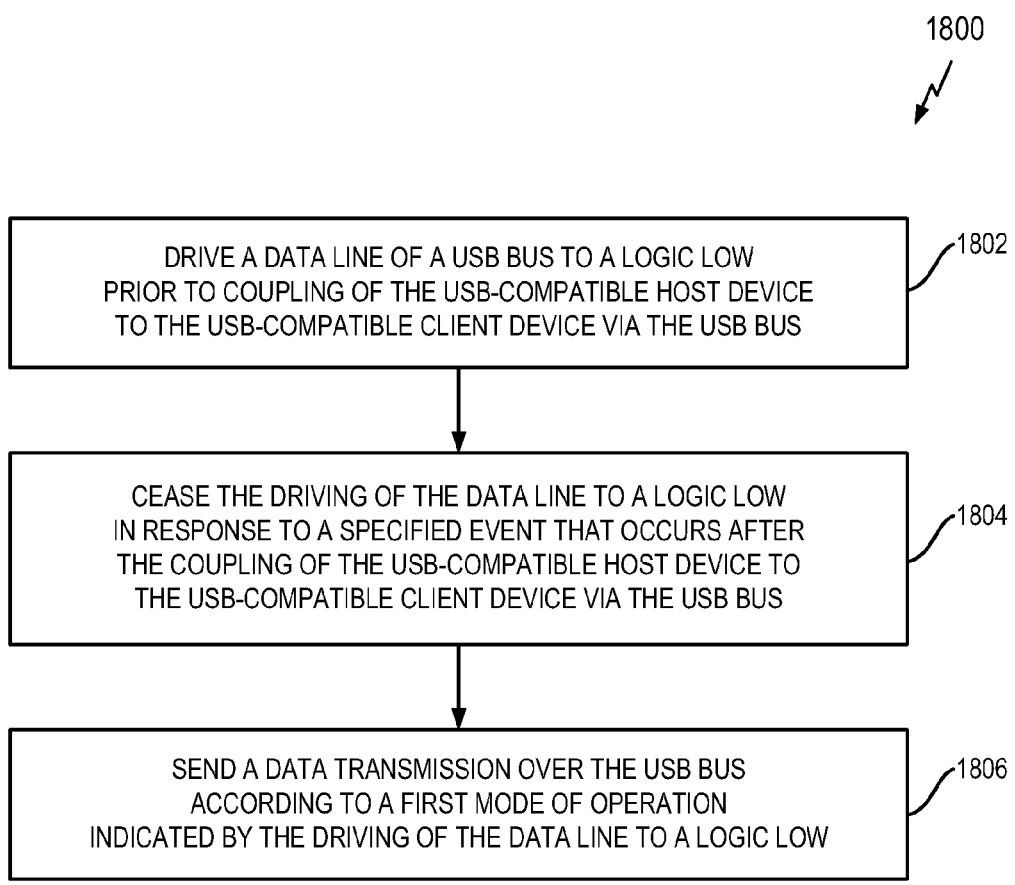
FIG. 18 is a flowchart illustrating a method of triggering a mode of operation in accordance with some aspects of the disclosure.

FIG. 18 illustrates a method 1800 for triggering a USB-compatible client device to operate in a desired mode of operation in accordance with some aspects of the disclosure. In various aspects within the scope of the disclosure, the method 1800 may be implemented by a USB-compatible host device or any other suitable apparatus capable of supporting signaling operations.

At block 1802, a data line of a USB bus is driven to a logic low prior to coupling of the USB-compatible host device to the USB-compatible client device via the USB bus. In some aspects, the data line is driven to a logic low within a threshold period of time after the coupling of the USB-compatible host device to the USB-compatible client device. In some aspects, the data line is driven to a logic low at a transmit driver of the USB-compatible host device. In some aspects, the driving of the data line to a logic low is not dependent on the data line being previously driven to a logic high (e.g., the USB host device is not driving the data line low as part of a conventional mission mode-based enumeration operation).

At block 1804, the driving of the data line to a logic low is ceased in response to a specified event that occurs after the coupling of the USB-compatible host device to the USB-compatible client device via the USB bus.

In some aspects, the specified event comprises another data line of the USB bus being driven to a logic high. In some aspects, the data line is a D+ line; and the other data line is a D– line.

In some aspects, the specified event comprises passing of a threshold period of time. In some aspects, the specified event comprises passing of a threshold period of time after the coupling of the USB-compatible host device to the USB-compatible client device.

At block 1806, a data transmission is sent over the USB bus according to a first mode of operation indicated by the driving of the data line to a logic low. In some aspects, the data transmission is sent as a result of the other data line being driven to a logic high.

Figure 19:
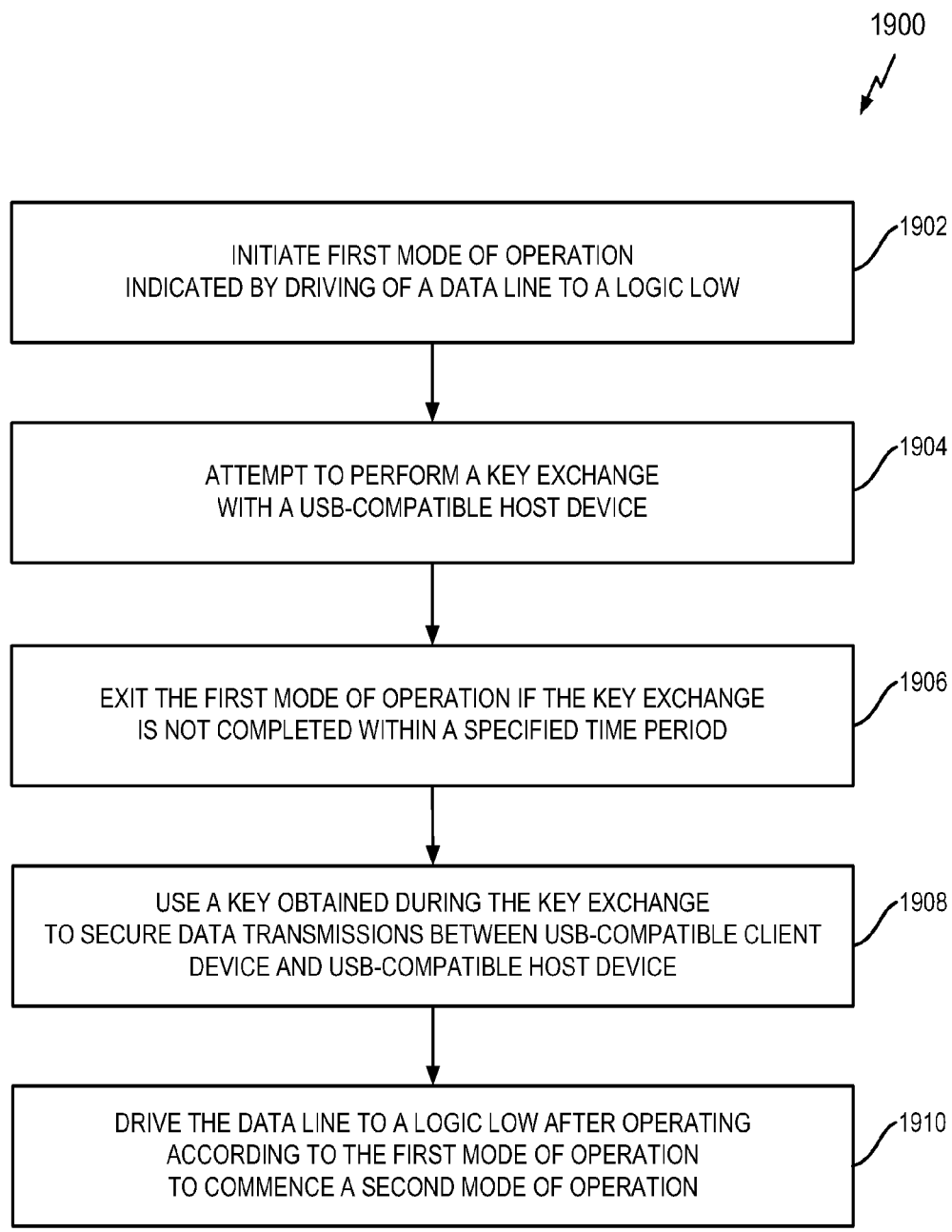
FIG. 19 is a flowchart illustrating additional aspects of a method of triggering a mode of operation in accordance with some aspects of the disclosure.

FIG. 19 is a method 1900 illustrating additional aspects relating to triggering a USB-compatible client device to operate in a desired mode of operation in accordance with some aspects of the disclosure. In various aspects within the scope of the disclosure, the method 1900 may be implemented by a USB-compatible host device or any other suitable apparatus capable of supporting signaling operations.

At block 1902, a first mode of operation indicated by driving of a data line to a logic low is initiated. In some aspects, the operations of block 1902 may correspond to the operations of blocks 1802 and 1804 of FIG. 18.

At optional block 1904, an attempt is made to perform a key exchange with the USB-compatible client device.

At optional block 1906, the first mode of operation is exited if the key exchange is not completed within a specified time period At optional block 1908, if the key exchange is successfully completed (e.g., within a specified time period), a key obtained during the key exchange is used to secure data transmissions between the USB-compatible client device and the USB-compatible host device.

At optional block 1910, the data line is driven to a logic low after operating according to the first mode of operation to commence a second mode of operation. For example, a conventional enumeration operation may be commenced after a non-mission mode terminates.

CONCLUSION

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method, operational at universal serial bus (USB)-compatible client device, of triggering a desired mode of operation the USB-compatible client device, comprising:

detecting that the USB-compatible client device has been coupled to a USB-compatible host device via a USB bus;

driving, from the USB-compatible client device, an interface to a data line of the USB bus to a logic high as a result of the detection;

determining that the data line remains at a logic low while the interface to the data line is being driven to a logic high, thereby indicating that the USB-compatible client device is to enter a first mode of operation; and operating the USB-compatible client device according to the first mode of operation as a result of the determination that the data line remains at a logic low despite the USB-compatible client device driving the interface to the data line to a logic high.

2. The method of claim 1, further comprising:
driving another data line of the USB bus to a logic high as a result of the determination that the data line is at a logic low.

3. The method of claim 2, wherein:
the data line is a D+ line; and
the other data line is a D− line.

4. The method of claim 2, wherein operating the USB-compatible client device according to the first mode of operation is triggered as a result of driving the other data line to a logic high.

5. The method of claim 2, wherein the other data line is driven to a logic high within a threshold period of time after detecting that the USB-compatible client device has been coupled to the USB-compatible host device.

6. The method of claim 1, wherein the determination that the data line is at a logic low is performed within a threshold period of time after detecting that the USB-compatible client device has been coupled to the USB-compatible host device.

7. The method of claim 1, wherein the data line is driven to a logic high for a period of time that is less than a reset time period.

8. The method of claim 1, wherein the detection comprises detecting presence of a voltage on a power line of the USB bus.

9. The method of claim 1, wherein the data line is driven to a logic low, by an external device, prior to the USB-compatible client device being coupled to the USB-compatible host device.

10. The method of claim 1, wherein the data line is driven to a logic low by externally coupling the data line to ground.

11. The method of claim 1, wherein the data line is driven to a logic low by a switch on the USB bus that couples the data line to a ground line.

12. The method of claim 1, wherein the data line is driven to a logic low at a transmit driver of the USB-compatible host device.

13. The method of claim 1, further comprising:
entering an enumeration mode of operation following the first mode of operation.

14. The method of claim 1, further comprising:
attempting to perform a key exchange with the USB-compatible host device; and
exiting the first mode of operation if the key exchange is not completed within a specified time period.

15. The method of claim 14, further comprising:
using a key obtained during the key exchange to secure data transmissions between the USB-compatible client device and the USB-compatible host device.

16. A universal serial bus (USB)-compatible client device, comprising:

a USB interface for communicating with a USB-compatible host device over a USB bus; and a USB processing circuit coupled to the USB interface, the USB processing circuit configured to detect that the USB-compatible client device has been coupled to a USB-compatible host device via a USB bus, drive, from the USB-compatible client device, an interface to a data line of the USB bus to a logic high as a result of the detection, determine that the data line remains at a logic low while the interface to the data line is being driven to a logic high, thereby indicating that the USB-compatible client device is to enter a first mode of operation, and operate the USB-compatible client device according to the first mode of operation as a result of the determination that the data line remains at a logic low despite the USB-compatible client device driving the interface to the data line to a logic high.

17. The device of claim 16, wherein the USB processing circuit is further configured to:
drive another data line of the USB bus to a logic high as a result of the determination that the data line is at a logic low.

18. The device of claim 17, wherein:
the data line is a D+ line; and
the other data line is a D− line.

19. The device of claim 17, wherein the other data line is driven to a logic high within a threshold period of time after detecting that the USB-compatible client device has been coupled to the USB-compatible host device.

20. The device of claim 16, wherein the determination that the data line is at a logic low is performed within a threshold period of time after detecting that the USB-compatible client device has been coupled to the USB-compatible host device.

21. The device of claim 16, wherein the detection comprises detecting presence of a voltage on a power line of the USB bus.

22. The device of claim 16, wherein the data line is driven to a logic low, by an external device, prior to the USB-compatible client device being coupled to the USB-compatible host device.

23. The device of claim 16, wherein the USB processing circuit is further configured to:
enter an enumeration mode of operation following the first mode of operation.

24. The device of claim 16, wherein the USB processing circuit is further configured to:
attempt to perform a key exchange with the USB-compatible host device; and
exit the first mode of operation if the key exchange is not completed within a specified time period.

25. The device of claim 24, wherein the USB processing circuit is further configured to:
use a key obtained during the key exchange to secure data transmissions between the USB-compatible client device and the USB-compatible host device.

26. A universal serial bus (USB)-compatible client device, comprising:
means for detecting that the USB-compatible client device has been coupled to a USB-compatible host device via a USB bus;

means for driving, from the USB-compatible client device, an interface to a data line of the USB bus to a logic high as a result of the detection;

means for determining that the data line remains at a logic low while the interface to the data line is being driven to a logic high, thereby indicating that the USB-compatible client device is to enter a first mode of operation; and means for operating the USB-compatible client device according to the first mode of operation as a result of the determination that the data line remains at a logic low despite the USB-compatible client device driving the interface to the data line to a logic high.

27. A non-transitory machine-readable storage medium having stored thereon instructions operational in a universal serial bus (USB)-compatible client device, which when executed by one or more processing circuits of the USB-compatible client device, causes one or more processing circuits to:

detect that the USB-compatible client device has been coupled to a USB-compatible host device via a USB bus;

drive, from the USB-compatible client device, an interface to a data line of the USB bus to a logic high as a result of the detection;

determining that the data line remains at a logic low while the interface to the data line is being driven to a logic high, thereby indicating that the USB-compatible client device is to enter a first mode of operation; and operating the USB-compatible client device according to the first mode of operation as a result of the determination that the data line remains at a logic low despite the USB-compatible client device driving the interface to the data line to a logic high.

\* \* \* \* \*